(12) United States Patent
Allen et al.

(10) Patent No.: US 8,292,517 B2
(45) Date of Patent: Oct. 23, 2012

(54) FIBER OPTIC MULTI DWELLING UNIT DEPLOYMENT APPARATUS AND METHODS FOR USING THE SAME

(75) Inventors: Barry Wayne Allen, Siler City, NC (US); David J. Braga, Raleigh, NC (US)

(73) Assignee: Tyco Electronics Corporation, Berwyn, PA (US)

( * ) Notice: Subject to any disclaimer, the term of this patent is extended or adjusted under 35 U.S.C. 154(b) by 0 days.

(21) Appl. No.: 13/431,365

(22) Filed: Mar. 27, 2012

(65) Prior Publication Data

US 2012/0189250 A1 Jul. 26, 2012

Related U.S. Application Data

(62) Division of application No. 12/420,912, filed on Apr. 9, 2009, now Pat. No. 8,167,504.

(60) Provisional application No. 61/121,751, filed on Dec. 11, 2008.

(51) Int. Cl.
*G02B 6/36* (2006.01)
*G02B 6/44* (2006.01)
*G02B 6/00* (2006.01)

(52) U.S. Cl. ............................ 385/76; 385/100; 385/135
(58) Field of Classification Search .................... 385/76, 385/100, 135, 88, 134, 147, 96–99
See application file for complete search history.

(56) References Cited

U.S. PATENT DOCUMENTS

| | | | |
|---|---|---|---|
| 4,707,074 A | 11/1987 | Heywood | 385/113 |
| 5,657,413 A * | 8/1997 | Ray et al. | 385/139 |
| 7,346,243 B2 | 3/2008 | Cody et al. | 385/100 |
| 7,555,181 B2 | 6/2009 | Temple et al. | 385/100 |
| 8,210,880 B2 * | 7/2012 | Lee et al. | 439/639 |
| 2007/0140640 A1 | 6/2007 | Temple et al. | |
| 2008/0107381 A1 | 5/2008 | Nishioka et al. | 385/60 |
| 2011/0014817 A1 * | 1/2011 | Lee et al. | 439/638 |

FOREIGN PATENT DOCUMENTS

| | | |
|---|---|---|
| JP | 54-106251 | 8/1979 |
| WO | WO 2007/103438 A2 | 9/2007 |

OTHER PUBLICATIONS

Invitation to Pay Additional Fees and Partial Search Report for corresponding PCT application No. PCT/US2009/066953 dated Mar. 17, 2010.
International Search Report and Written Opinion for corresponding PCT application No. PCT/US2009/066953 dated May 20, 2010.
International Preliminary Report on Patentability Corresponding to International Application No. PCT/US2009/066953; Date of Mailing: May 11, 2011; 19 Pages.
Invitation to Restrict or Pay Additional Fees corresponding to PCT/US2009/066953; Date of Mailing Mar. 24, 2009; 4 Pages.

* cited by examiner

*Primary Examiner* — Akm Enayet Ullah
(74) *Attorney, Agent, or Firm* — Myers Bigel Sibley & Sajovec

(57) ABSTRACT

An optical fiber terminal apparatus includes an optical fiber protection jacket including a pre-defined, longitudinally extending seam that can be opened at a selected location along the jacket to define an opening into the optical fiber protection jacket at the selected location. The apparatus further includes an adapter terminal configured to mate with an outer profile of the optical fiber protection jacket. The adapter terminal includes a body portion that is configured to support a coupling between an optical fiber extending from the opening in the optical fiber protection jacket to a customer optical fiber. The seam may be repeatably and selectively closable.

23 Claims, 18 Drawing Sheets

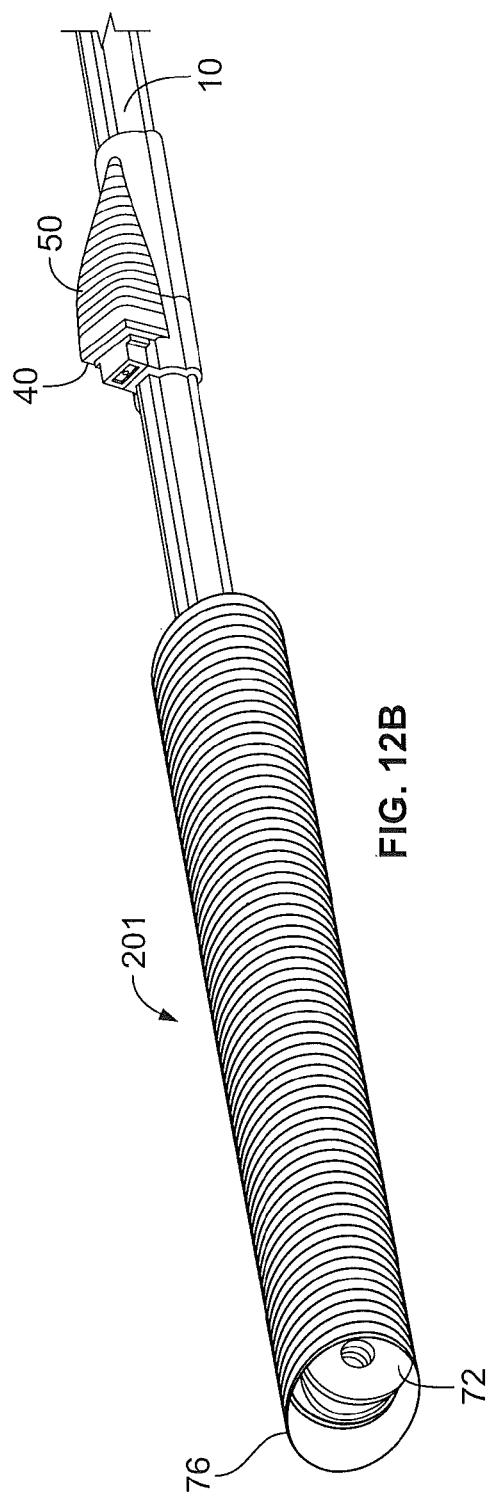
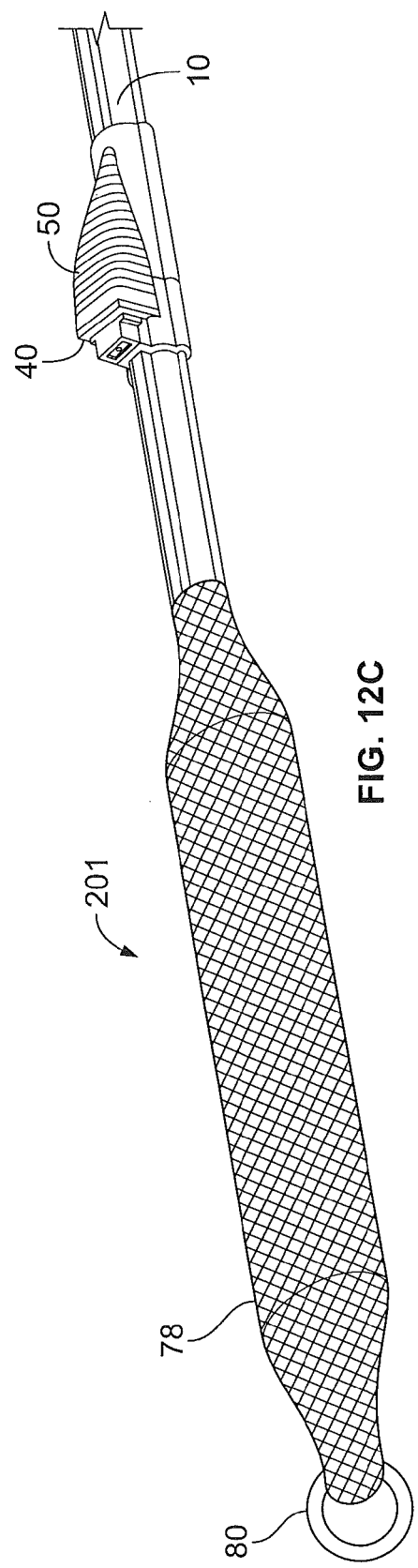

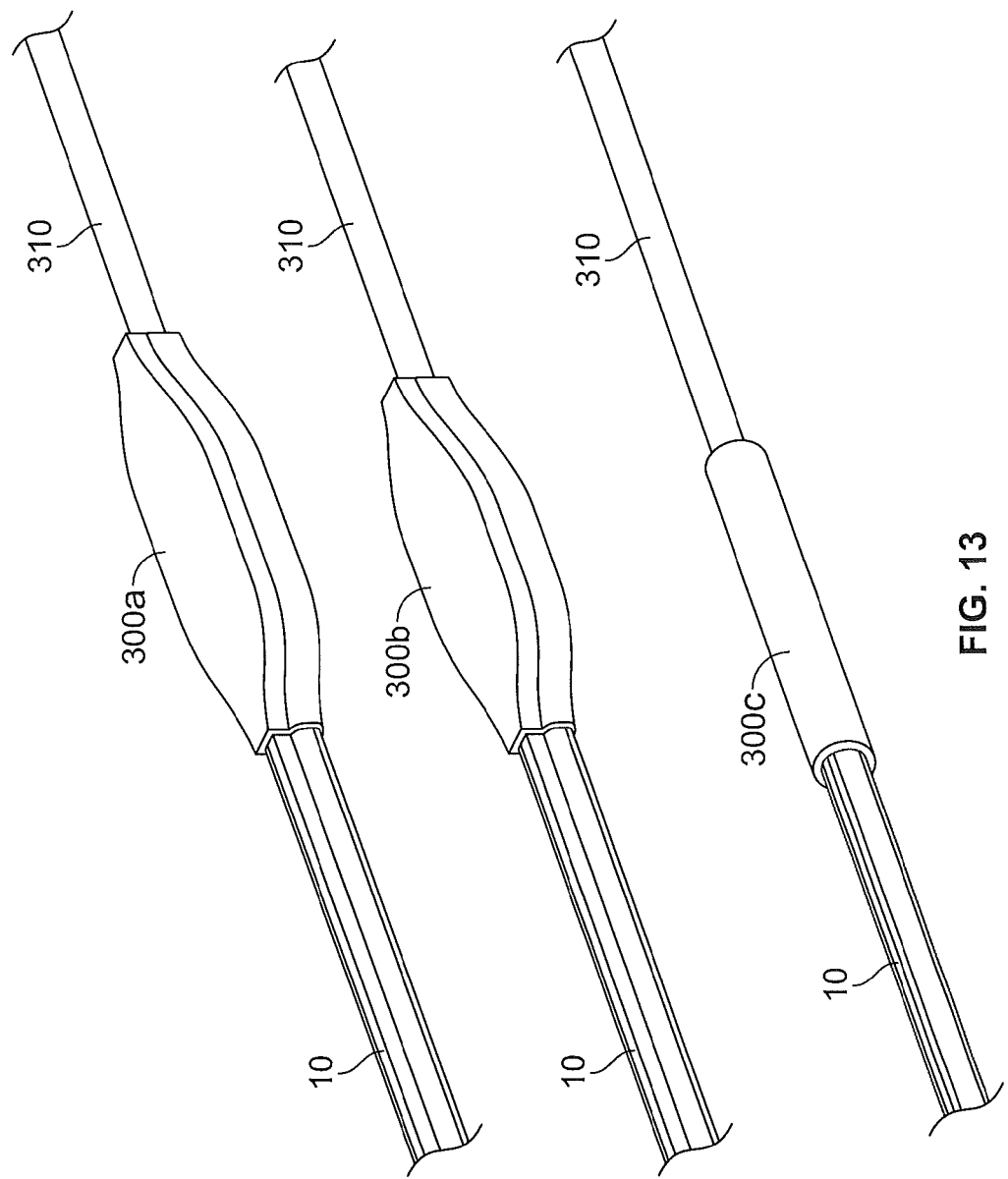

FIBER OPTIC MULTI DWELLING UNIT DEPLOYMENT APPARATUS AND METHODS FOR USING THE SAME

RELATED APPLICATIONS

The present application is a divisional of U.S. patent application Ser. No. 12/420,912 filed on Apr. 9, 2009 now U.S. Pat. No. 8,167,504 which claims the benefit of and priority from U.S. Provisional Application No. 61/121,751 filed Dec 11, 2008, the disclosures of which are hereby incorporated herein in their entireties by reference.

BACKGROUND OF THE INVENTION

The present invention relates to optical fiber products and, more particularly, to optical fiber deployment products and methods for using the same.

Optical fiber networks (e.g. Plastic, Glass, Multimode, Singlemode, etc.) are increasingly being installed to support high speed voice and data communications. As part of this effort, the optical fiber deployment is being expanded out from the central office of the communication service provider companies, such as Regional Bell Operating Companies (RBOCs), to the subscriber locations, such as apartments or condominiums. Such subscriber locations are commonly referred to as multi-dwelling units (MDUs), where conventional copper wiring or coax was typically used. Upgrading existing structures from a copper network to a fiber optic network poses issues regarding suitable and acceptable pathways required to deliver optical fiber cabling compared to conventional single dwelling homes that typically route the fiber directly via aerial or buried cables.

Race ways, conduit and moldings have typically been used to create surface mounted pathways when existing concealed pathways can not be obtained or created. The goal of most MDU deployments is to preposition optical cables, required to deliver service, inside the structure as close to the subscriber(s)' unit(s) as possible during a construction phase. A secondary installation and maintenance phase occurs when subscribers choose to connect to the network and the installer connects the subscribers' respective electronics via an optical jumper to the prepositioned cable.

Current methods for prepositioning optical fibers typically include placing multiple cables inside the surface mounted pathways to accommodate the various subscriber termination points (apartment A, B, C, etc. . . . ) throughout the structure. These cables can quickly overwhelm the capacity of the pathway and in turn be difficult to manage (e.g., tangling of drop cables or the like). Single sheath solutions have been attempted as well, however these methods typically require cutting into the cable to access the specific optical fiber to be prepositioned at the various subscriber termination points throughout the structure. Single sheath methods, while they may address the congestion issue, generally require risky and labor intensive cutting procedures to open the cable.

SUMMARY OF THE INVENTION

Embodiments of the present invention include an optical fiber terminal apparatus including an optical fiber protection jacket including a pre-defined, longitudinally extending seam that can be opened at a selected location along the jacket to define an opening into the optical fiber protection jacket at the selected location. The apparatus further includes an adapter terminal configured to mate with an outer profile of the optical fiber protection jacket. The adapter terminal includes a body portion that is configured to support a coupling between an optical fiber extending from the opening in the optical fiber protection jacket to a customer optical fiber. The seam may be repeatably and selectively closable.

In further embodiments, the adapter terminal is configured to be coupled to the optical fiber protection jacket and is longitudinally slidable along the optical fiber protection jacket. In some embodiments, the adapter terminal is snapped onto the optical fiber protection jacket. The adapter terminal may include a first flexible arm portion and a second flexible arm portion extending from the body portion that are configured to extend around respective sides of the optical fiber protection jacket and snap the adapter terminal onto the optical fiber protection jacket. The flexible arm portions may each include a latch member at an end thereof displaced from the body portion and the optical fiber protection jacket may include mating latch members on the outer surface thereof that are configured to engage the latch member of the flexible arm portions when the adapter member is snapped on the outer protective jacket.

In other embodiments, the optical fiber protection jacket is a wrap-around jacket with a first zip engagement member on a first transverse end thereof and a mating second zip engagement member on an opposite second transverse end thereof. The adapter terminal includes a zip engagement member receiving channel that is configured to receive the first and second engagement members when the adapter terminal is snapped on the optical fiber protection jacket and the channel is configured to facilitate closing of the opening in the optical fiber protection jacket.

In further embodiments, the optical fiber protection jacket is configured to limit a preferential bend direction of the optical fiber protection jacket. The optical fiber protection jacket may include at least one longitudinally extending rib, a wall having a thickness that is varied at selected radial locations, a flexible material contained within the optical fiber protection jacket and/or strength members embedded in the wall of the optical fiber protection jacket to limit the preferential bend direction. The optical fiber protection jacket may be a cross-linked polymer and/or a plurality of co-molded different materials to limit the preferential bend direction.

In other embodiments, the optical fiber termination apparatus further includes a protective cover that is configured to limit longitudinal movement of the adapter terminal when the protective cover is placed over the body portion of the adapter terminal on the optical fiber protection jacket. The body portion of the adapter terminal may include a first optical fiber port configured to receive a source connector coupled to the optical fiber extending from the optical fiber protection jacket and a second optical fiber port configured to receive a customer connector coupled to the customer optical fiber.

In further embodiments, the adapter terminal further includes a dust cap having a closed position covering the second optical fiber port and an open position not covering the second optical fiber port to allow the customer connector to be inserted into the second optical fiber port. The dust cover may be spring loaded towards the closed position and configured to be in the open position when the customer connector is inserted in the second optical fiber port. The terminal apparatus may further include a plurality of clips configured to secure the optical fiber protection jacket in a selected location.

In other embodiments, the body portion includes a connector that is configured to couple the optical fiber extending from the opening in the optical fiber protection jacket to the customer optical fiber. A plurality of longitudinal movement restricting members may be positioned at selected longitudinal locations in the optical fiber protection jacket that limit longitudinal movement of the optical fibers within the optical fiber protection jacket. The longitudinal movement restriction members may be gel and/or adhesive blocks.

In further embodiments, a connector is coupled to a first end of at least one of the plurality of optical fibers positioned at a first longitudinal end of the optical fiber protection jacket. A strain relief member may couple the connector to the first longitudinal end of the optical fiber protection jacket. The connector may be a multi-fiber connector (MFC) coupled to the first ends of a plurality of the optical fibers.

In other embodiments, ends of the plurality of optical fibers extending from a first end of the optical fiber protection jacket have a substantially same length thereof extending from the optical fiber protection jacket and have connectors on the ends thereof. The fiber optic system further includes a low-profile pulling device that is configured to hold the optical fibers extending from the optical fiber protection jacket in an arrangement with the fibers folded back onto themselves to define a return fiber path and to hold the connectors positioned in a staggered array along the return fiber path to provide the low profile pulling device a reduced width from a longitudinal offset of ones of the connectors allowing the connectors to be positioned closer to a center of the low profile pulling device without contacting each other.

In yet further embodiments, low-profile pulling devices are provided for pulling a plurality of optical fibers having connectors thereon through a conduit. The pulling device includes a body member configured to hold the optical fibers in an arrangement with the fibers folded back onto themselves to define a return fiber path and the connectors positioned in a staggered array along the return fiber path to provide the low profile pulling device a reduced width from a longitudinal offset of ones of the connectors allowing the connectors to be positioned closer to a center of the body member without contacting each other.

In other embodiments, the body member further includes a plurality of bend limiting members positioned at respective fold back locations that are configured to limit bending of corresponding ones of the optical fibers when folded back around the respective bend limiting members.

In yet other embodiments, a fiber optic system for a multi-dwelling unit includes a plurality of optical fibers and a longitudinally extending optical fiber protection jacket wrapped around the optical fibers. The optical fiber protection jacket includes a pre-defined longitudinally extending seam that can be opened at selected longitudinal locations along the jacket to define a plurality of openings at the selected longitudinal locations on the optical fiber jacket to provide access to the optical fibers through the openings in the optical fiber protection jacket at the selected longitudinal locations on the optical fiber protection jacket. A plurality of adapter terminals are provided that are configured to mate with an outer profile of the optical fiber protection jacket at the selected longitudinal locations. Each of the adapter terminals includes a body portion that is configured to support a coupling between one of the optical fibers extending from an underlying one of the openings to a customer optical fiber. The seam may be repeatably and selectively closable.

In other embodiments, the fiber optic system further includes a loop back apparatus at a first longitudinal end of the optical fiber protection jacket. The loop back apparatus includes a bend limiting member around which the plurality of optical fibers are wrapped to provide a continuous light path from a first end of the optical fibers at a second, opposite longitudinal end of the optical fiber protection jacket to a second end of the optical fibers at the second end of the optical fiber protection jacket. An outer cover encloses the bend limiting member and segments of the optical fibers extending from the first end of the optical fiber protection jacket. The outer cover may include an opening allowing access to the bend limiting device and the optical fibers therein. The loop back apparatus may further include a pulling eye coupled to the opening that is movable to a closed position in which access to the bend limiting device through the opening in the outer cover is limited. At least one of the optical fibers may include a splice between the first and second longitudinal ends thereof that is positioned in the segment of the at least one of the optical fibers extending from the first end of the optical fiber protection jacket and the loop back apparatus may further include a wrap around enclosure positioned within the outer cover that holds the splice.

In further embodiments, methods of installing a fiber optic system in a multi-dwelling unit include routing a longitudinally extending optical fiber protection jacket that is wrapped around a plurality of optical fibers from a source connection location along a selected path through the multi-dwelling unit. The selected path extends past a plurality of dwelling units within the multi-dwelling unit. A plurality of longitudinal locations along the optical fiber protection jacket are selected that are associated with respective ones of the dwelling units. The optical fiber protection jacket includes a pre-defined longitudinally extending seam that can be opened at the selected longitudinal locations along the jacket to define a plurality of openings at the selected longitudinal locations on the optical fiber jacket to provide access to the optical fibers through the openings in the optical fiber protection jacket at the selected longitudinal locations on the optical fiber protection jacket. A plurality of adapter terminals are mated to the optical fiber protection jacket at the selected longitudinal locations. The adapter terminals are configured to mate with an outer profile of the optical fiber protection jacket at the selected longitudinal locations and each of the adapter terminals includes a body portion that is configured to couple one or more of the optical fibers extending from an underlying one of the openings to a customer optical fiber. Routing the optical fiber protection jacket, selecting the locations and mating the adapter terminals may be carried out for a plurality of optical fiber protection jackets along different paths to provide access to ones of the optical fibers at locations associated with different ones of the dwellings.

In other embodiments, routing the optical fiber protection jacket is followed by testing the optical characteristics of the routed optical fibers from the source connection location. A loop back apparatus at a first longitudinal end of the optical fiber protection jacket displaced from a second longitudinal end at the source connection location contains a bend limiting member around which the plurality of optical fibers are wrapped to provide a continuous light path from a first end of the optical fibers at the first longitudinal end of the optical fiber protection jacket to a second end of the optical fibers at the second end of the optical fiber protection jacket. The multi-dwelling unit may be a multi-floor building and respective ones of the paths may extend along different ones of the floors. The method may further include routing the optical fibers from a plurality of source connection locations on the different ones of the floors to a fiber distribution hub and the optical fiber protection jackets may be secured at the source connection locations to optical fiber cables extending to the fiber distribution hub. Testing the optical characteristics may be done from the fiber distribution hub.

In yet further embodiments, mating the adapter terminals is followed by identifying an additional dwelling unit in the multi-dwelling unit to be provided a connection to one of the optical fibers. A location along one of the optical fiber protection jackets is selected that is associated with the additional dwelling unit. An additional adapter terminal is mated to the associated optical fiber protection jacket at the selected location and a customer optical fiber associated with the additional dwelling unit is coupled to the one of the optical fibers using the additional adapter terminal.

BRIEF DESCRIPTION OF THE DRAWINGS

FIGS. 12A-12C are perspective views of a loop back apparatus according to some embodiments of the present invention in various stages of assembly.

FIG. 13 is a perspective view of various apparatus for joining optical fiber protection jackets to standard cables according to some embodiments of the present invention.

DETAILED DESCRIPTION OF EMBODIMENTS OF THE INVENTION

Figure 1:
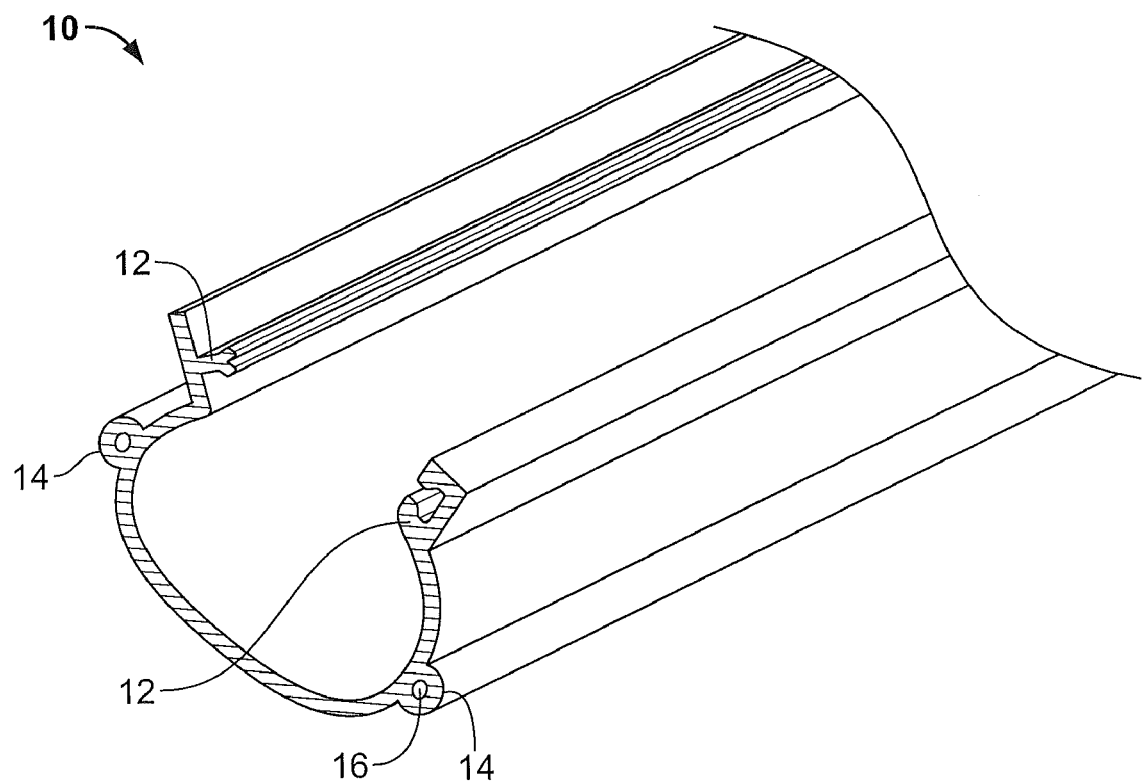
FIG. 1 is a perspective view illustrating a section of an optical fiber protection jacket according to some embodiments of the present invention.

The present invention now will be described more fully hereinafter with reference to the accompanying drawings, in which illustrative embodiments of the invention are shown. In the drawings, the relative sizes of regions or features may be exaggerated for clarity. This invention may, however, be embodied in many different forms and should not be construed as limited to the embodiments set forth herein; rather, these embodiments are provided so that this disclosure will be thorough and complete, and will fully convey the scope of the invention to those skilled in the art.

It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the present invention.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90° or at other orientations) and the spatially relative descriptors used herein interpreted accordingly.

As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof. It will be understood that when an element is referred to as being "connected" or "coupled" to another element, it can be directly connected or coupled to the other element or intervening elements may be present. As used herein, the term "and/or" includes any and all combinations of one or more of the associated listed items.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and will not be interpreted in an idealized or overly formal sense unless expressly so defined herein.

Embodiments of the present invention (Zip Tube Systems) may combine the benefits of the multiple cable and single sheath methods into one design. Some embodiments may allow the construction crew to deploy and manage a single sheath cable that contains multiple optical fibers during phase one and also allow easy access (no cutting of the sheath) along its entire length for installers to connect subscribers to the network during phase two. Some embodiments of the present invention provide an apparatus and methodology for organizing and bundling the optical fibers awaiting connection to customers to be defined (identified). Various embodiments of the present invention provide optical fiber cabling and distribution apparatus and methods for using the same that may be beneficial in MDU environments.

Some embodiments of the present invention now will be described more fully hereinafter with reference to the accompanying figures. This invention may, however, be embodied in many different forms and should not be construed as limited to the embodiments set forth herein. Like numbers refer to like elements throughout the description of the figures unless stated otherwise.

Fiber optic MDU deployment (Zip Tube System) apparatus according to some embodiments of the present invention may be used in race ways, conduits, cove moldings and the like. The zip tubes may be arranged in a bundle to deliver multiple groups of fibers to different groups of subscribers or used as a single tube intended for two or more subscribers along a run. The tube bundle as well as the fibers inside the tube may be, for example, stranded, lashed, or laid in parallel to form bundles and groups. Tube design may employ a hybrid copper/fiber construction to support deployment of both a copper and fiber network. In either case the zip tube may be marked to ensure the proper fiber can be located. This may be achieved, for example, by color coding the exterior and/or by unique identity codes such as a serial/foot number running repeatedly along its length. These devices may be placed (vertically and/or horizontally) in a surface mounted race way and/or in conduit behind the wall but could also be used as a stand alone cable in other locations that would allow reasonable access to open the tube and access the fibers.

Referring now to the embodiments illustrated in FIGS. 1 to 25, methods and systems will be described that may provide a wrap around interlocking jacket that can be opened and closed many times without a tool. In further embodiments, a tool may be provided that facilitates entry and closing of the jacket. The tool in some embodiments is similar to a zipper, and may in some embodiments be snapped onto the jacket once the jacket was initially opened. In some embodiments, the tool may provide the benefit of allowing the craft person accessing the bundle to unzip and zip the tube closed over a significant distance (e.g., 10 or more feet) minimizing the number of times a ladder would need to be repositioned. The tool may also push the fibers back into the jacket in a manner that reduces or even eliminates possible pinching of fibers.

Figure 2E:
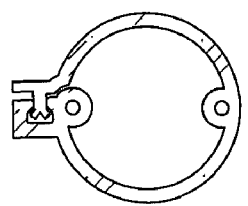
FIG. 2 is a cross-sectional view of a plurality of different profiles suitable for use as the optical fiber protection jacket of FIG. 1.
Figure 2J:
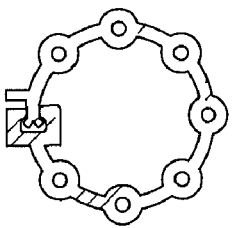
Figure 2O:
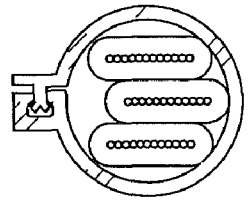
Figure 2D:
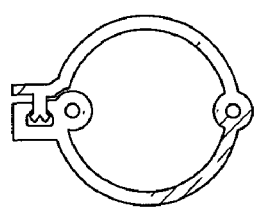
Figure 2I:
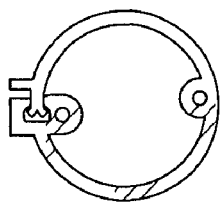
Figure 2N:
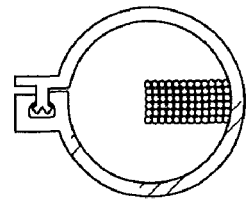
Figure 2C:
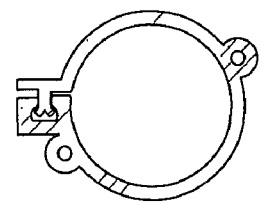
Figure 2H:
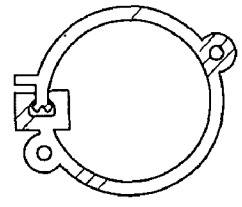
Figure 2M:
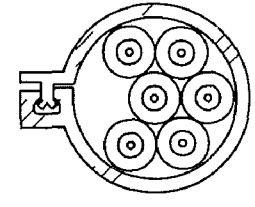
Figure 2B:
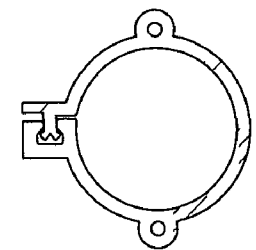
Figure 2G:
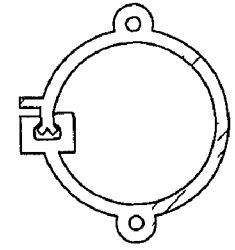
Figure 2L:
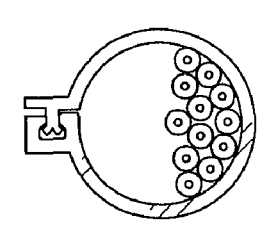
Figure 2A:
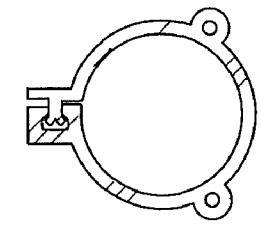
Figure 2F:
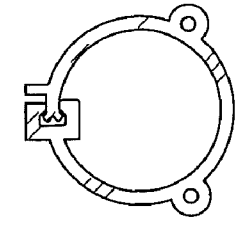
Figure 2K:
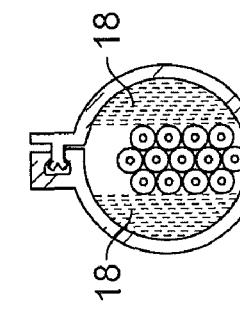
Figure 3:
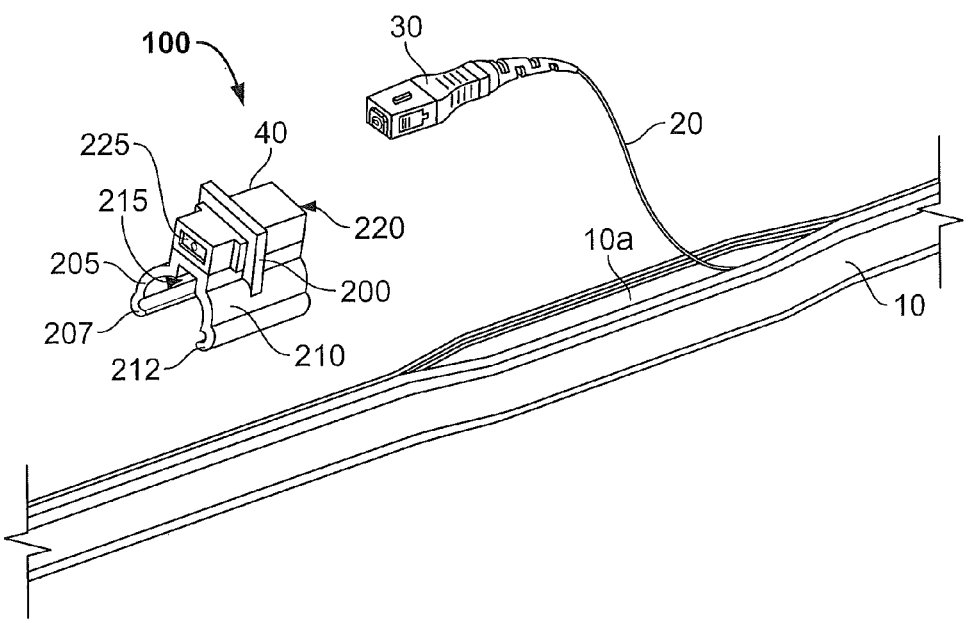
FIG. 3 is a partially exploded view of an optical fiber termination apparatus according to some embodiments of the present invention.
Figure 4:
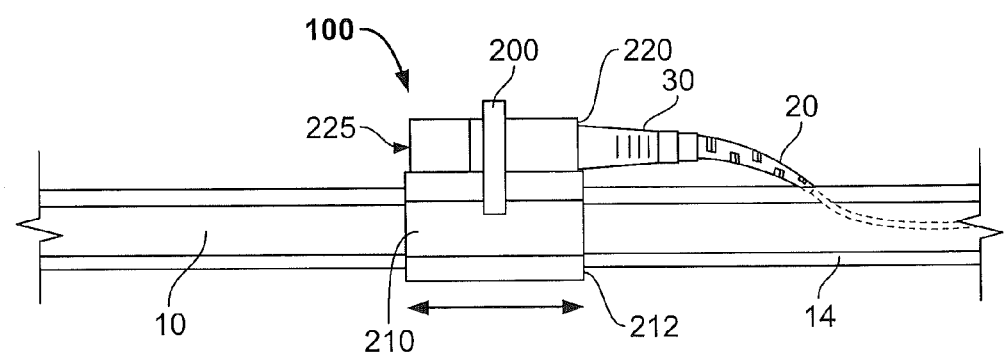
FIG. 4 is a side view of the apparatus of FIG. 3.
Figure 5:
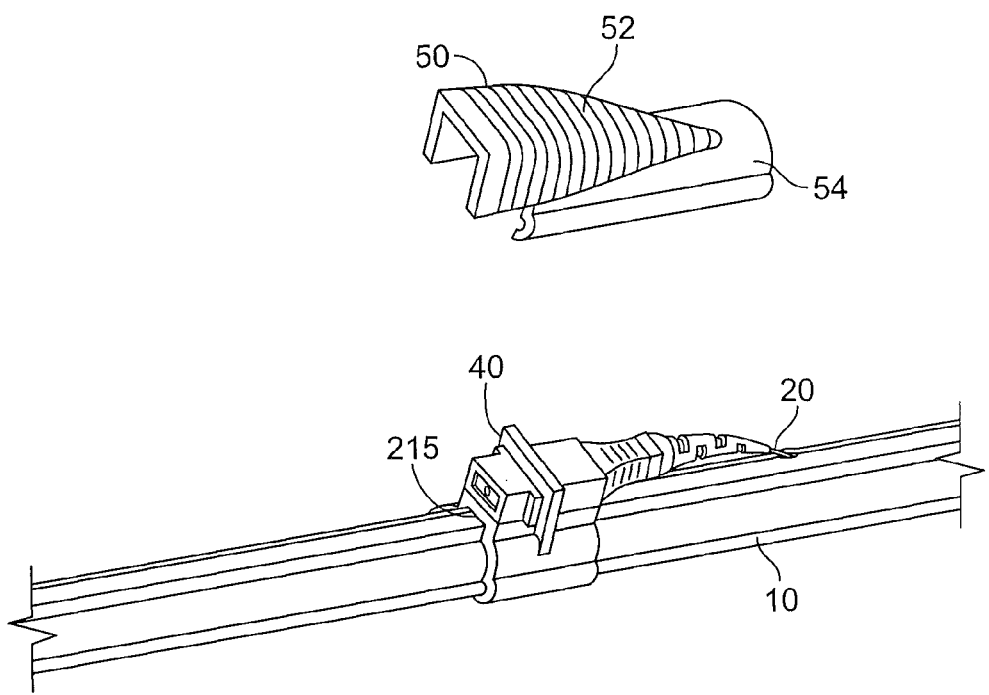
FIG. 5 is a partially exploded view of an optical fiber termination apparatus according to some embodiments of the present invention.
Figure 6:
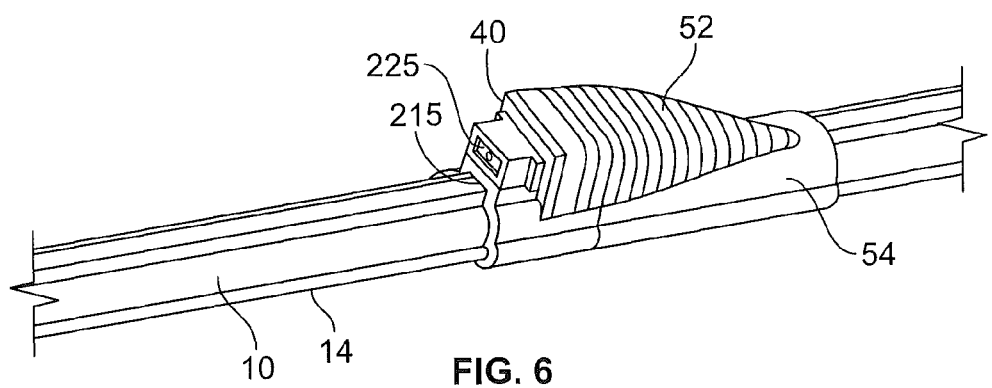
FIG. 6 is a perspective view of the apparatus of FIG. 5.

An optical fiber terminal apparatus according to some embodiments of the present invention will now be described with reference to FIGS. 1-6. FIG. 3 is a partially exploded view of an optical fiber termination apparatus according to some embodiments of the present invention. FIG. 4 is a side view of the apparatus of FIG. 3. FIG. 5 is a partially exploded view of an optical fiber termination apparatus according to some embodiments of the present invention including a protective cover. FIG. 6 is a perspective view of the apparatus of FIG. 5.

FIGS. 3 to 8 illustrate an optical fiber terminal apparatus 100 that may be field installed and method of installing a fiber optic system using the same according to some embodiments that may provide a breakout connection point used to connect a customer to the network. The terminal apparatus 100 includes an adapter terminal 40 configured to mate with an outer profile of an optical fiber protection jacket 10 at a selected longitudinal location on the jacket 10. More particularly, in the embodiments of FIGS. 3-8, the adapter terminal 40 is configured to be snapped onto the optical fiber protection jacket 10 and be longitudinally slidable along the optical fiber protection jacket 10. In some embodiments, the adapter terminal 40 may be installed substantially anywhere along the zip tube's (jacket's) length. The illustrated jacket 10 is a wrap-around jacket with a zipper type closure having a seam that may be opened to define a longitudinally extending opening 10a allowing access to optical fiber(s) 20 in the interior of the jacket 10 at a selected location. The seam may be repeatedly and selectively closable and multiple such that openings 10a may be provided at a plurality of selected longitudinal location along the jacket 10.

Referring now to FIG. 3 the installer of a fiber optic system has located the appropriate jacket/tube 10 (as the system may include multiple jackets extending to various locations), unzipped a section of the seam to define the opening 10a at the selected location, accessed a fiber(s) 20 and terminated a field installed source connector 30, such as an SC/APC connector. The connector 30 may be referred to as a source connector herein as, in some embodiments, the fiber(s) 20 in the jacket 10 extend from a source location that is to be coupled to a customer proximate the selected location using the opening 10a. In some embodiments, it may be desirable to replace a mechanical connector with a fusion or mechanical splice. Other embodiments would allow a sufficient length of the selected fiber to be removed from the tube, up jacketed for protection and passed directly to the subscriber/customer premises via the breakout apparatus (termination apparatus 100). The breakout/termination apparatus 100 may include variations from the illustrated embodiments under these configurations. The breakout adapter terminal 40 may be snapped onto the zip tube/jacket 10 as seen in the side view of FIG. 4.

In some embodiments, the adapter terminal 40 may also act as the tool that facilitates opening and closing of the seam in the jacket/tube 10 to provide the opening 10a at the selected location and a plurality of adapter terminals 40 may provide a plurality of such openings at different selected locations along the jacket 10. The illustrated terminal 40 is configured to mate (interlock) with the outer profile of the zip tube jacket 10 and in the illustrated embodiments may slide along the length of the jacket 10. The access/source connector 30 coming from, for example, the telephone company central office (CO), is installed into the adapter terminal 40. The arrow in FIG. 4 illustrates how the adapter terminal 40 may be slid along the longitudinal axis (length) of the jacket 10, for example, to reduce or even eliminate slack and tension on the fiber 20 caused when the field mounted connector 30 was installed.

As seen in FIG. 3, the illustrated adapter terminal 40 includes a body portion 200 that is configured to couple an optical fiber 20 extending through the opening 10a from the optical fiber protection jacket 10 to a customer optical fiber. The illustrated adapter terminal 40 includes a first flexible arm portion 210 and a second flexible arm portion 205 extending from the body portion 200 that are configured to extend around respective sides of the optical fiber protection jacket 10 and snap the adapter terminal 40 onto the optical fiber protection jacket 10. The illustrated flexible arm portions 210, 205 each include a latch member 212, 207 at an end thereof displaced from the body portion 200 configured to engage mating latching members on the optical fiber protection jacket 10. An embodiments of the mating latch members is the ribs 14 shown on the outer surface of the outer protective jacket 10 in FIG. 1, which are configured to engage the latch member 212, 207 of the flexible arm portions 210, 205 when the adapter member 40 is snapped on the outer protective jacket 10.

For the embodiments illustrated in FIGS. 3-6, the body portion 200 of the adapter terminal 40 includes a first optical fiber port 220 that is configured to receive a source connector 30 coupled to the optical fiber 20 extending from the opening 10a in the optical fiber protection jacket 10 and a second optical fiber port 225 defining a connector that is configured to receive a customer connector coupled to a customer optical fiber, which may, for example, extend from a customer's dwelling unit in a MDU to thereby couple an optical fiber extending from the opening in the optical fiber protection jacket to the customer optical fiber. However, it will be understood that, in some embodiments, the body portion 200 may not include a connector and may be configured to support a splice coupling the optical fiber extending from the opening in the optical fiber protection jacket to the customer optical fiber. Furthermore, while a single fiber coupling arrangement is shown in the body portion 200 in the embodiments of FIGS. 3-4, it will be understood that, in some embodiments, a plurality of connectors may be provided, such as two LC connectors in a duplex arrangement, and two or more connections may thereby be supported by a single adapter terminal. Similarly, multiple splices may be supported in embodiments where connector(s) are note provided in the body portion 200.

FIGS. 5 and 6 illustrate embodiments of a protective cover 50 that, in some embodiments, is applied to the adapter terminal 40. The protective cover 50 may be configured to protect the connector 30 from environmental and physical damage that may occur during installations. The protective cover 50 may also hold the zip tube jacket 10 together, limiting or even preventing spontaneous unzipping of the jacket 10. In some embodiments, once the protective cover 50 is installed on the adapter terminal 40 over the body portion 200 of the adapter terminal 40, longitudinal movement of the adapter terminal 40 along the length of the jacket 10 may be limited or even prevented to provide the adapter terminal 40 a fixed location as shown in FIG. 6.

The illustrated protective cover in FIGS. 5 and 6 includes a hood portion 52 extending over the body portion 200 and a latch portion 54. The latch portion 54, similarly to the adapter terminal 40, is configured to mate the protective cover 50 to the optical fiber protection jacket 10 at the selected location. As noted above, the inner portion of the latch portion may be configured to engage the optical fiber protection jacket 10 in a manner that limits longitudinal movement along the jacket 10 of the adapter terminal 40.

FIG. 1 is a perspective view illustrating a section of the optical fiber protection jacket 10 having a zipper closure seam defined by respective zip engagement members 12 and ribs 14 according to some embodiments of the present invention. As seen in FIG. 1, a strength member 16 may be incorporated in the jacket 10. As also seen in FIG. 1, the optical fiber protection jacket 10 is a wrap-around jacket and the zipper closure seam is defined by the first zip engagement member 12 on a first transverse end thereof and the mating second zip engagement member 12 on an opposite second transverse end thereof.

FIG. 2 includes cross-sectional views of a plurality of different profiles suitable for use as the optical fiber protection jacket 10 of FIG. 1. As seen in FIGS. 1 and 2, the profile in some embodiments is configured to minimize a preferential bend direction that can be caused by the zipper. In various embodiments the minimized/reduced preferential bend direction may be provided by, for example, placing ribs 14 at various radial orientations along the length of the zip tube (jacket 10), varying the wall thickness in appropriate sections, inserting foam, gel or other flexible/pliable material 18 into the tube 10, imbedding strength members 16 into the ribs/tube wall, cross linking the polymer that the tube 10 is made from, co-molding the tube from multiple materials or combinations of the above.

As best seen in FIGS. 5 and 6, the illustrated adapter terminal 40 includes a zip engagement member receiving channel 215 that is configured to receive the first and second engagement members 12 when the adapter terminal 40 is snapped on the optical fiber protection jacket 10. In some embodiments, the channel 215 is configured to facilitate closing of the opening 10a in the optical fiber protection jacket 10.

Figure 7:
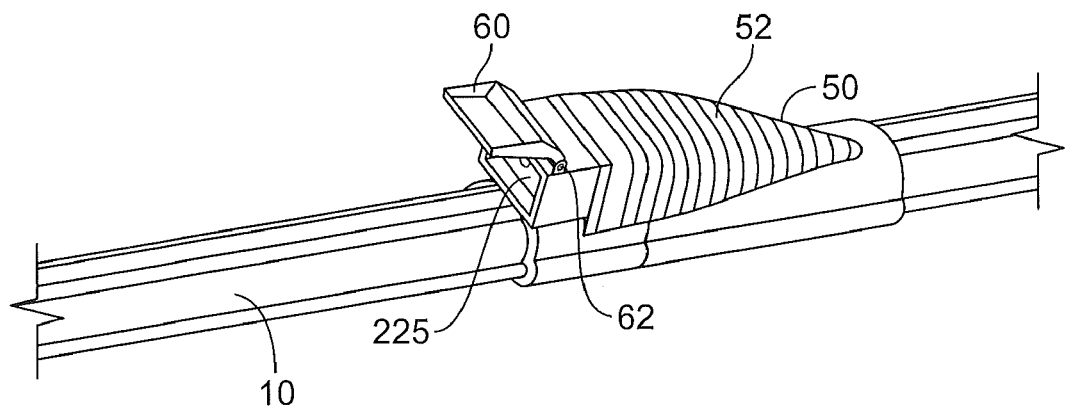
FIG. 7 is a perspective view of an optical fiber termination apparatus according to further embodiments of the present invention with a dust cover in the open position.
Figure 8:
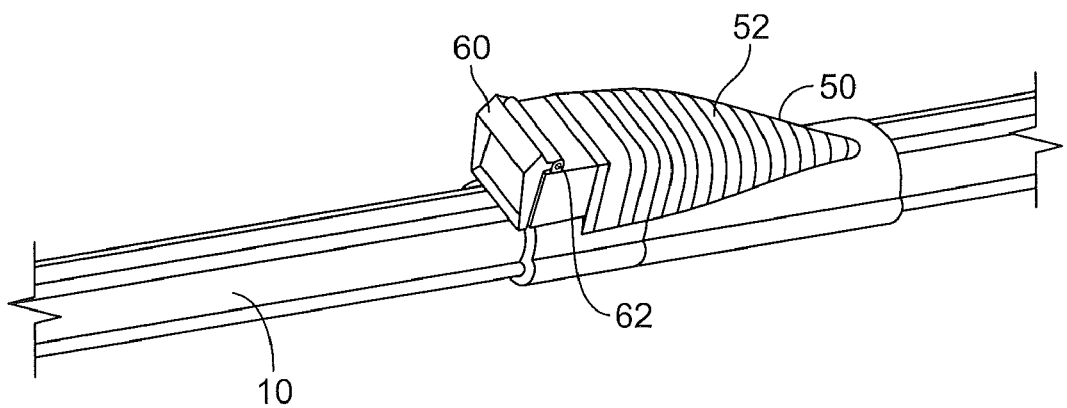
FIG. 8 is a perspective view of the apparatus of FIG. 7 with the dust cover in the closed position.

Further embodiments of the present invention will now be described with reference to FIGS. 7 and 8. The illustrated embodiments of FIGS. 7 and 8 may help ensure safe handling of laser light by provision of an integrated pivoting dust cap 60 coupled to the adapter terminal 40. The dust cap 60 has a closed position covering the second optical fiber port 225 as illustrated in FIG. 8 and an open position not covering the second optical fiber port 225 to allow the customer connector to be inserted into the second optical fiber port as illustrated in FIG. 7. The dust cap 60 is shown as pivotally mounted to the body portion 200 by a spring loaded hinge 62 so that the dust cap 60 is spring loaded towards the closed position and configured to be held in the open position of FIG. 7 by the customer connector when the customer connector is inserted in the second optical fiber port 225. Although the adapter terminal 40 may not require a dust cap as it would generally be installed shortly before connecting the subscriber, the dust cap 60 may eventually be desired, for example, if service was terminated and the subscriber's fiber was disconnected from the network.

Figure 9:
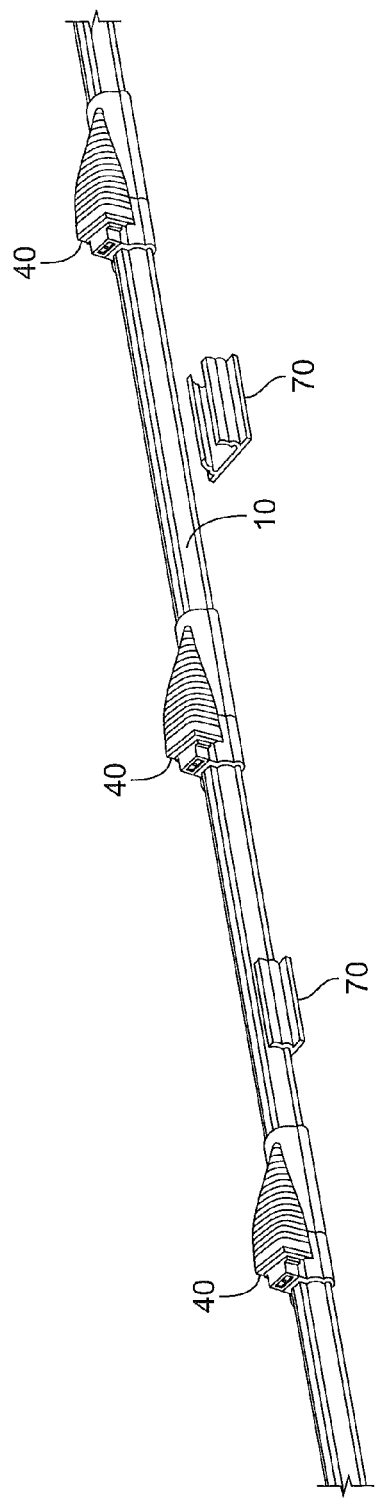
FIG. 9 is a perspective view of an optical fiber termination apparatus according to further embodiments of the present invention.

FIG. 9 illustrates how, in some embodiments, a clip system can be utilized to secure the optical fiber protection jacket 10 in a selected location (desired position). The clips 70 may provide a convenient snap in and out feature by using an interlock design that mates with the outer profile of the jacket 10.

A loop back apparatus and method according to some embodiments will now be described, which may simplify testing and system validation performed in phase one and typically required prior to a construction group handing over the network to an installation and maintenance group in phase two of the build. Embodiments of the loop back apparatus and method may provide a continuous light path all the way out and back (from a test point location) to allow testing of the fibers from such a single test point location, such as the fiber distribution hubs or floor consolidation point. Optical testing with an OTDR can reveal if and where the fibers have been compromised in any way along the path (length) of the zip tube jacket 10. Such a compromise of the fiber may result, for example, from bending beyond the fiber's limits, pinching and/or the like. Typical network designs require multiple crew members to be located at both ends of the path. The loop back design allows one person to test the network from a single location.

Figure 10:
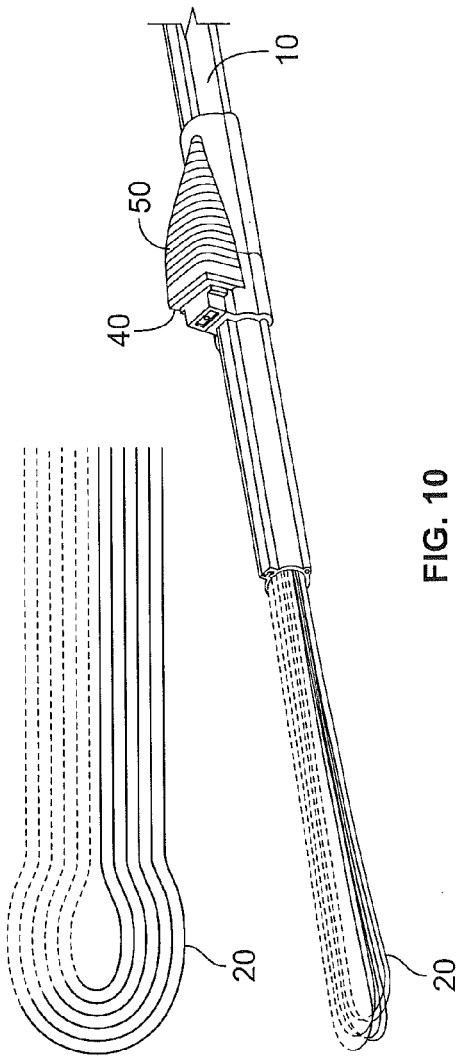
FIG. 10 is a perspective view of an optical fiber termination apparatus according to further embodiments of the present invention.
Figure 11:
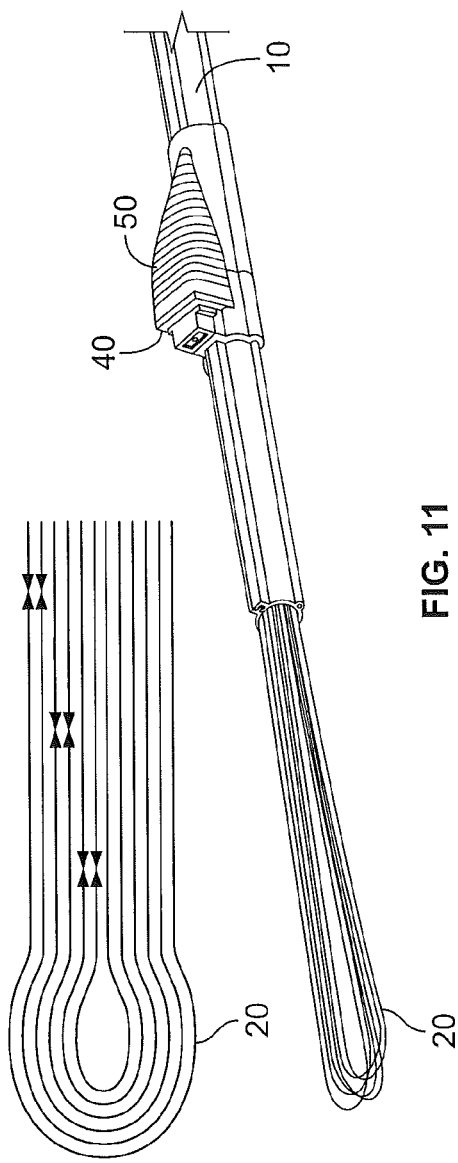
FIG. 11 is a perspective view of an optical fiber termination apparatus according to further embodiments of the present invention.

FIGS. 10 and 11 illustrate various methods of providing continuity of the fibers 20 at the end of the run. As seen in FIG. 10, the fibers 20 are folded in half and encased within the optical fiber protection jacket 10 (illustrated by a transition of the fibers 20 to a dotted line in the figures at the end point. In such embodiments, inline printing may be used, for example, mark the half of the fiber running back to the beginning of the run (test location) so as to identify the designated fiber during the installation phase. As seen in FIG. 11, a splice is used (shown as an "x" in the figure) to connect a mated pair of fibers. This approach may simplify manufacturing of the a terminal apparatus 100 including an optical fiber protection jacket as described herein with fibers 20 therein and provide the ability to have unique color code identifier for each fiber in the bundle without the need for, for example, inline printing.

Figure 12A:
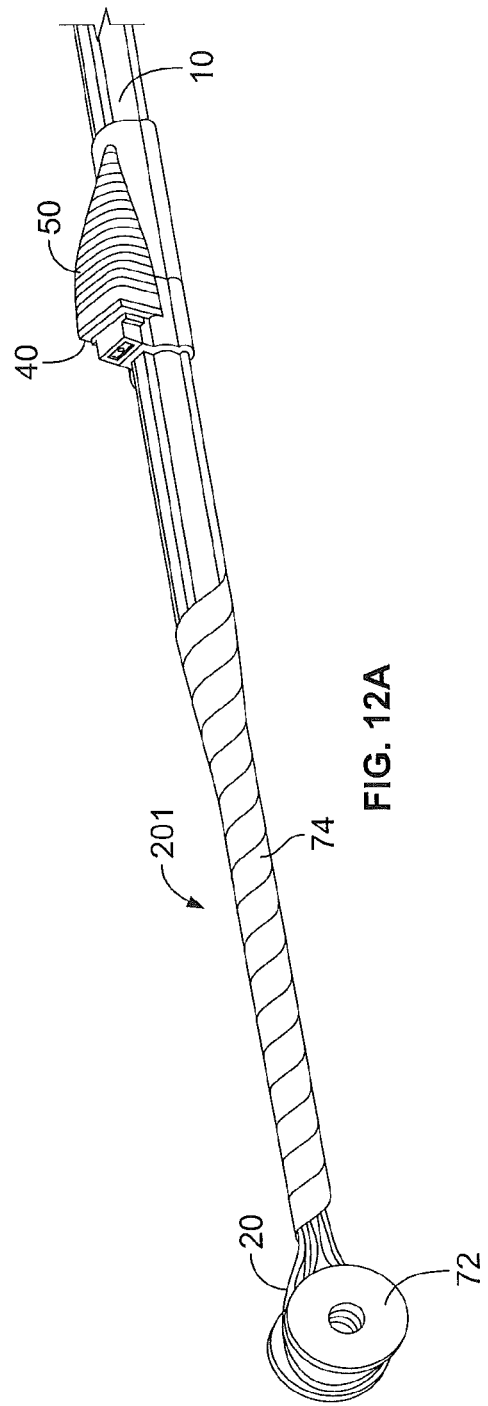

FIGS. 12a-12c illustrates a protective apparatus (loopback apparatus) 201 that may be used to control the bend of the fiber at the end of the loop back and hold the splices of the embodiments of FIG. 11. More particularly, as seen in FIG. 12a, the fibers 20 are wrapped around a bend limiting device, such as a spool 72 and a tape, spiral wrap or the like defines a wrap around enclosure 74 that may hold the splices. As seen in FIG. 12b, a relatively rigid body member 76, shown as a corrugated tube, is placed over the spool 72 and enclosure 74 to limit or even prevent crushing/damage thereto during the construction phase. The body member 76 may be removed before application of the cover 78 illustrated in FIG. 12c. The illustrated cover 78 includes an integrated pulling eye 80 and may be used to encase the end of the loopback apparatus 201 at the end of the construction phase, for example.

In some embodiments, the loop back apparatus 201 is positioned at a first longitudinal end of an optical fiber protection jacket that is installed, for example, extending along a selected path past dwellings in an MDU. The loop back apparatus 201 as described above may include a bend limiting member 72 around which a plurality of optical fibers 20 are wrapped to provide a continuous light path from a first end of the optical fibers at a second, opposite longitudinal end of the optical fiber protection jacket to a second end of the optical fibers at the second end of the optical fiber protection jacket. An outer cover 78 may enclose the bend limiting member 72 and segments of the optical fibers 20 extending from the first end of the optical fiber protection jacket 10 to which the loop back apparatus 201 is attached.

The outer cover 78 may include an opening allowing access to the bend limiting device and the optical fibers therein and the loop back apparatus may further include the pulling eye 80 coupled to the opening that is movable to a closed position seen in FIG. 12c in which access to the bend limiting device 72 through the opening in the outer cover 78 is limited. As seen in FIG. 11, the optical fiber(s) may include a splice between the first and second longitudinal ends thereof that is positioned in the segment of the optical fibers 20 extending from the first end of the optical fiber protection jacket 10 and the loop back apparatus 201 may further include the wrap around enclosure 74 positioned within the outer cover 78 that holds the splice(s).

FIG. 13 illustrates various apparatus and methods for joining the zip tube optical fiber protection jacket 10 to standard cables 310 used in optical networks according to some embodiments. The enclosure 300a, 300b, 300c used to join the cable ends can be configured to provide various functions. These may include holding: splices, slack storage and splitters, including, for example, wave and power splitters, as well as providing a fixation point for strength members and flexible strain relief exit point. An elongated wrap around enclosure 300a may be employed to provide splice fixation points and service loops typically required for splicing fibers together as well as holding a fan out device and/or optical splitters. By including bend insensitive fiber into the transition point, the minimum bend radius (i.e. relative width of the closure) required for service loops may be significantly reduced. A shorter wrap around enclosure 300b may be used as a jacket transition and/or to hold inline devices that do not require a service loop, such as a ribbon splice. A potential benefit of the zip tube construction in some embodiments is the ability to strip back the jacket 10 away from fibers to facilitate handling and use of optical splice equipment at a transition or splice point and then reconstitute the jacket back over the fibers. An example of this would be when a factory ribbon cable was spliced to multiple single fibers that needed to be ribbonized within a single zip tube/jacket 10 to facilitate mass fusion splicing. The shortest possible wrap around enclosure may be used in the case of two zip tube protection jackets 10 being joined together via mass fusion splice. Also illustrated is a simple way of joining the two pieces of cable together, a tubular inline sleeve 300c, such as a piece of heat shrink or molded on polymer.

Figure 14A:
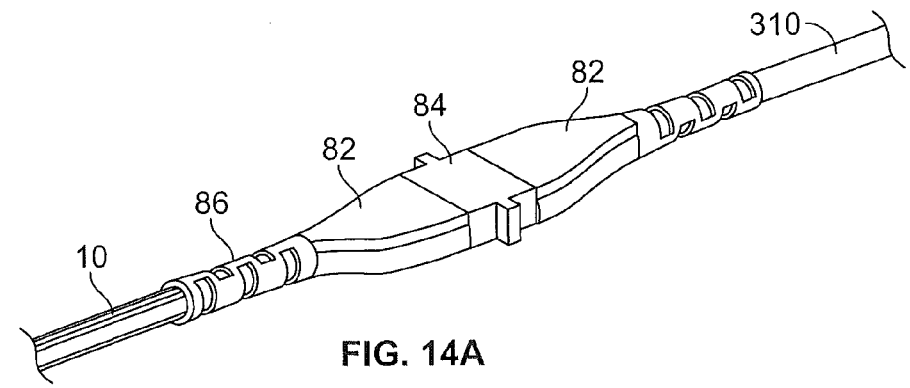
FIG. 14A is a perspective view of an apparatus for joining optical fiber protection jackets to standard cables according to other embodiments of the present invention.
Figure 14B:
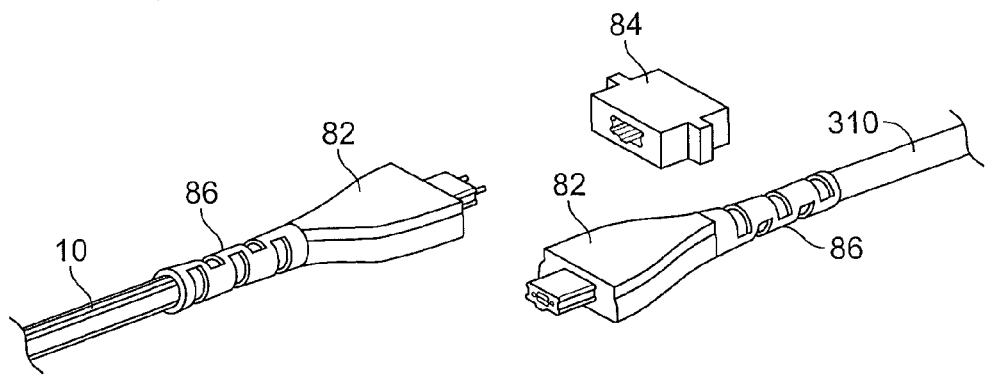
FIG. 14B is an exploded perspective view of the apparatus of FIG. 14A.
Figure 15A:
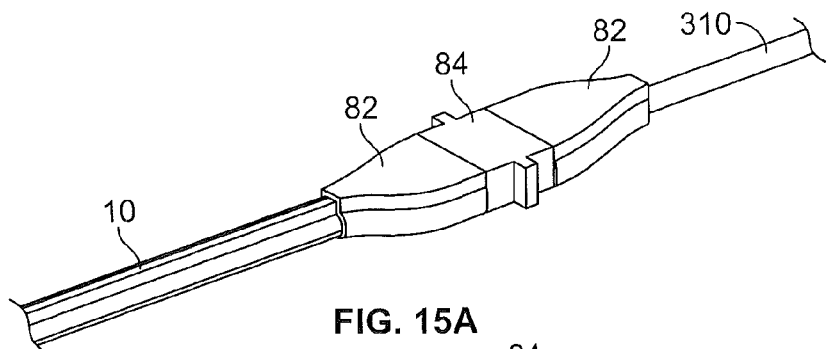
FIG. 15A is a perspective view of an apparatus for joining optical fiber protection jackets to standard cables according to other embodiments of the present invention.
Figure 15B:
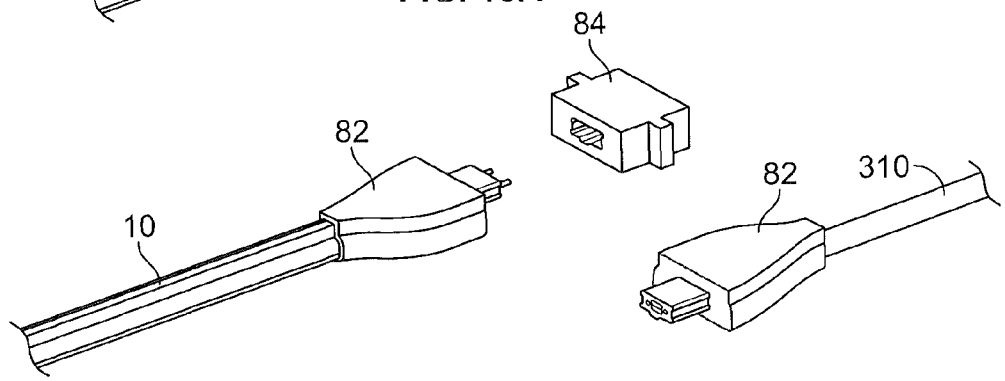
FIG. 15B is an exploded perspective view of the apparatus of FIG. 15A.

The cables in some embodiments are joined together via multi fiber connectors 82 and an adapter 84 as illustrated in FIGS. 14a and 14b. A flexible strain relief member 86 is shown in FIG. 14a that may be configured to protect the exit point. Such a strain relief member 86, although not illustrated, may likewise be used with the embodiments of FIGS. 13 and 15. FIG. 14a shows the transition from a zip tube protection jacket 10 to a conventional cable 310 with the flexible strain relief member 86 in the assembled configuration as contrasted with the unconnected configuration shown in FIG. 14b.

Figure 16:
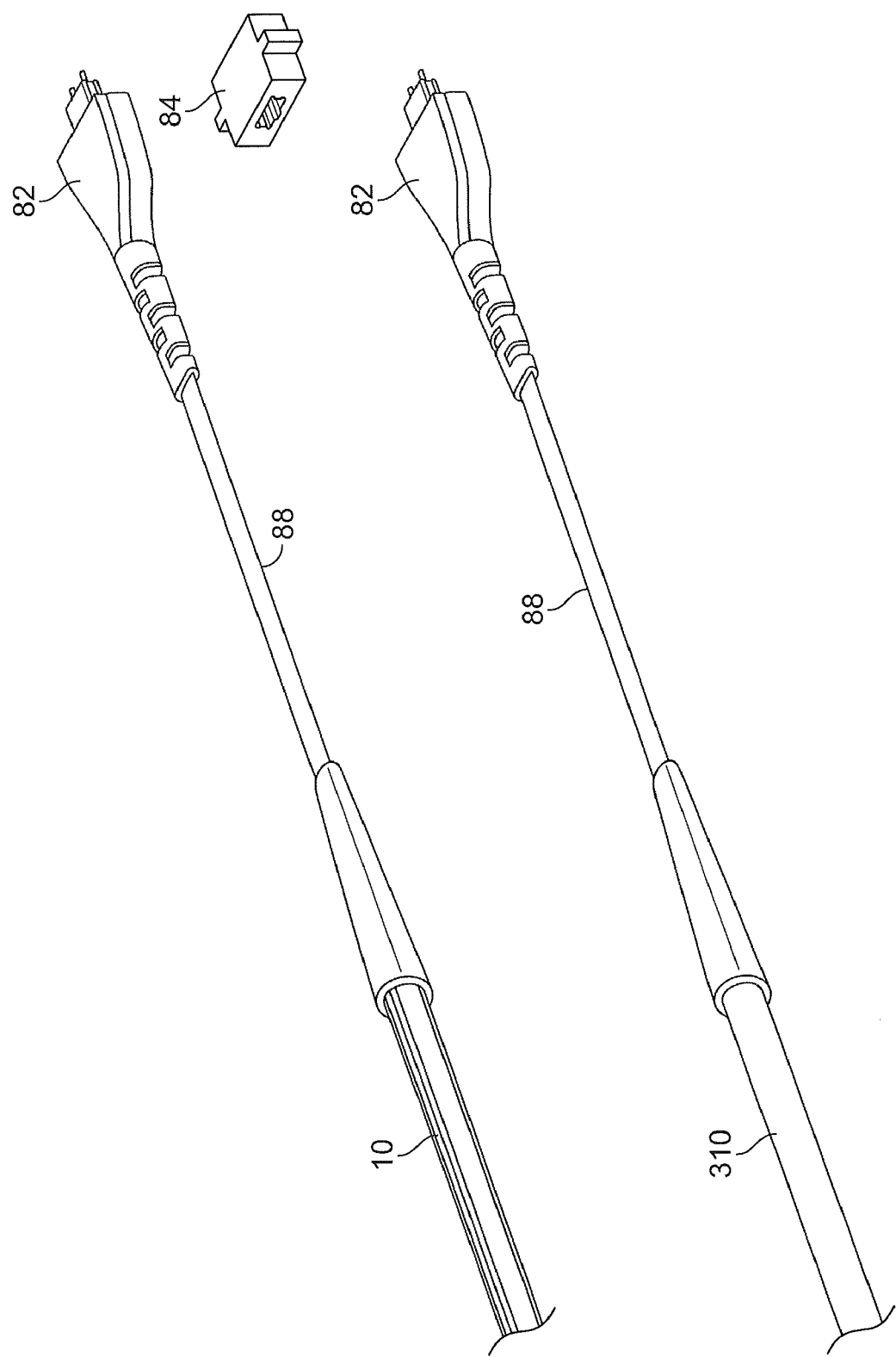
FIG. 16 is an exploded perspective view of an apparatus for joining optical fiber protection jackets to standard cables according to other embodiments of the present invention.

In some network locations, it may be desirable to provide a transition 88 from a zip tubing jacket 10 to a flexible cable 310, such as the transition 88 illustrated in FIG. 16. This may facilitate routing inside a box or to a desired connection or splice point. Although FIG. 16 illustrates embodiments where the zip tubing 10 transitions to a single furcated tube terminated with a multi fiber connector 82, in some embodiments, a fan-out is positioned at the end of the zip tubing 10 that transitions into many tubes that would have as few as one terminated splice or connecter per tube end. The reduced diameter may allow the transition 88 section of cable to have a significantly reduced minimum bend diameter as opposed to the zip tube jacket 10 itself.

Figure 17:
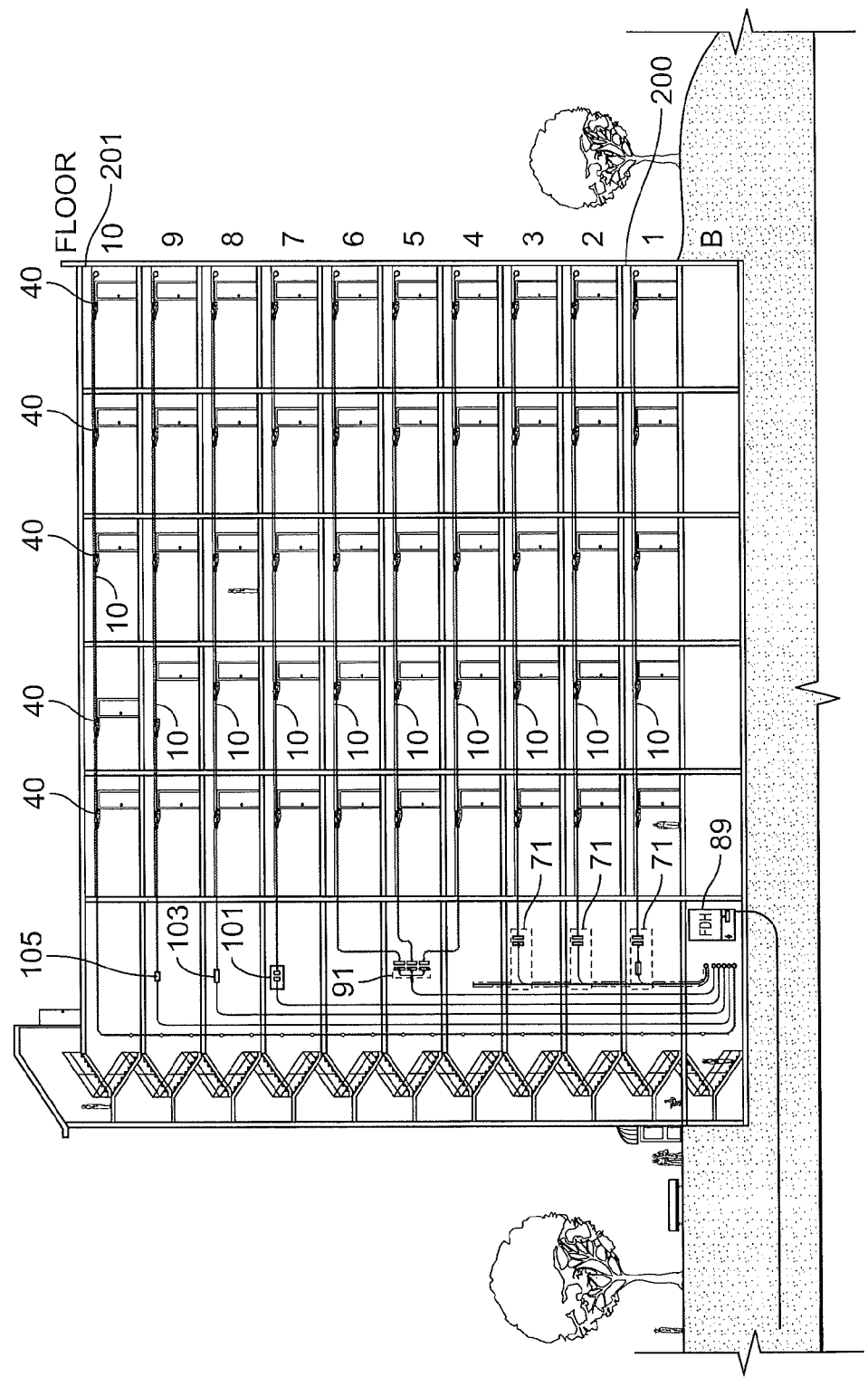
FIG. 17 is a schematic view of a fiber optic system for a multi-dwelling unit according to some embodiments of the present invention.
Figure 18:
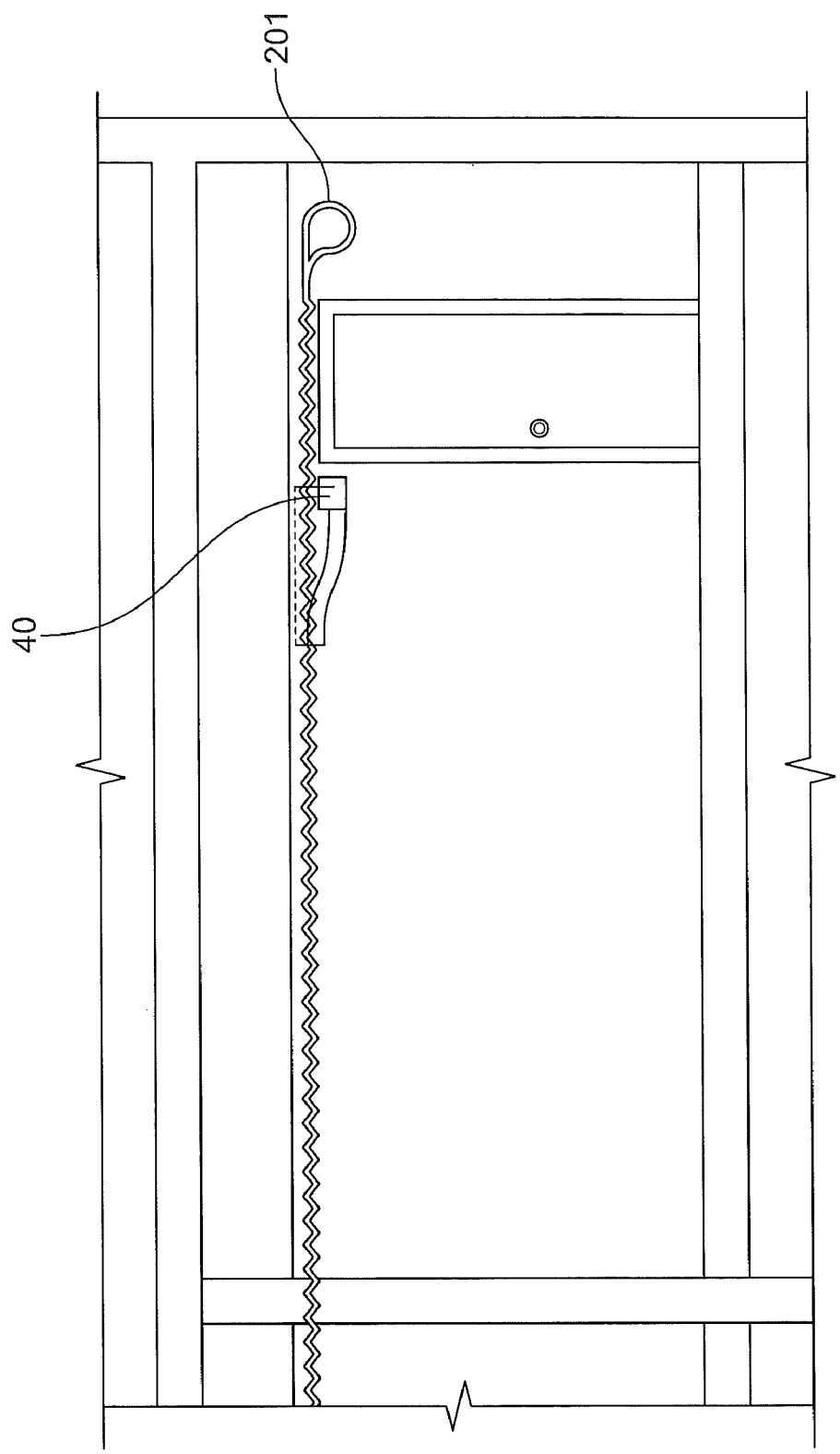
FIGS. 18-22 are enlarged schematic views of portions of the fiber optic system of FIG. 17.

An zip tube optical fiber protection jacket based fiber optic system for a multi-dwelling unit (MDU) system may be deployed in many ways inside existing MDU structures as will now be described with reference to the schematic illustrations of FIGS. 17-22. FIG. 17 illustrates some of the many methods that may utilize the zip tube optical fiber protection jacket 10 and the components described above in the fiber optic system network. For description purposes, the zip tube jacket 10 is represented schematically as a zigzag line. The ground floor is floor one of the illustrated ten story apartment building. Subscribers (customers) are represented by doors of individual dwelling units, with unit one being on the left of each floor and unit five being on the right. The stair well is oversized for illustration purposes. Regardless of the particular network configuration of a specific MDU structure, FIG. 18 illustrates how the loopback protective apparatus 201 may be located at the end of a run and how the field installed adapter terminal 40 would typically be located near the subscriber's doorway. A hole may be drilled into the unit at this point to allow the mated (customer) fiber (continuous, spliced and/or connectorized) to pass from the zip tube protection jacket 10 into the subscriber's unit.

Thus, as seen schematically in FIG. 17, a fiber optic system for a multi-dwelling unit may include a plurality of optical fibers with a longitudinally extending optical fiber protection jacket 10 wrapped around the optical fibers. The optical fiber protection jacket 10 defines a plurality of openings at selected longitudinal locations (shown proximate individual dwelling unit doors in FIG. 17) on the optical fiber protection jacket 10 that are repeatedly and selectively closable to provide access to the optical fibers through the optical fiber protection jacket at the selected longitudinal locations on the optical fiber protection jacket. FIG. 17 further illustrates the system includes a plurality of adapter terminals 40 configured to mate with an outer profile of the optical fiber protection jacket 10 at the selected longitudinal locations. As described above, each of the adapter terminals 40 includes a body portion that is configured to couple one of the optical fibers extending from an underlying one of the openings to a customer optical fiber. More particularly, in FIG. 17, a plurality of optical fiber protection jackets 10 are routed along different paths (shown as respective floors in FIG. 17) to provide access to ones of the optical fibers at locations associated with different ones of the dwellings. As will now be further described, the zip tube optical fiber protection jacket 10 may not be used for the entire route from an access point such as the illustrated fiber distribution hub 89.

Figure 19:
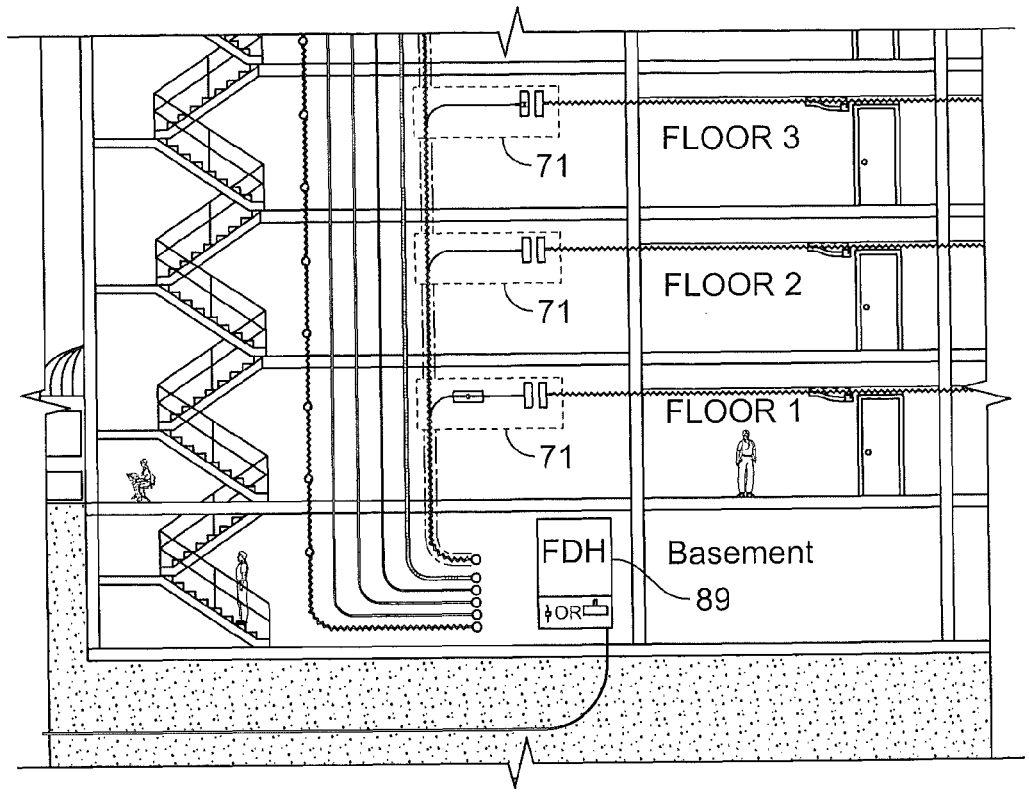

A rigid conduit deployment method as illustrated in FIG. 19 is shown as being used to provide service to floors one through three. The rigid conduit is represented by a dash dot line. A source connection location, shown as a floor box 71 on each floor, is represented by the dash line. A reduced diameter conduit (not shown) may be used to form a protective pathway from the floor box 71 located in the stairwell to the stairwell/floor wall. At this point, the pathway continues through the wall into the surface mounted raceway or deployment pathway on each floor. The deployment path is then shown as a zip tube optical fiber protection jacket 10, which may contain multiple ribbon fibers as illustrated in FIGS. 2n and 2o. The appropriate ribbon may be cut and removed from the zip tube protection jacket 10 at the floor box 71. The ribbon end could be spliced to a multi fiber pigtail as depicted on floor one or the multi-fiber connector could have been installed at the factory as depicted on floor two or the ribbon could have a field installed multi-fiber connector installed on site as depicted on floor three. In all three cases, a vertical fiber is shown mated to a fiber in the horizontally extending zip tube protection jacket 10 via a multi-fiber connector at the floor box 71.

Figure 23:
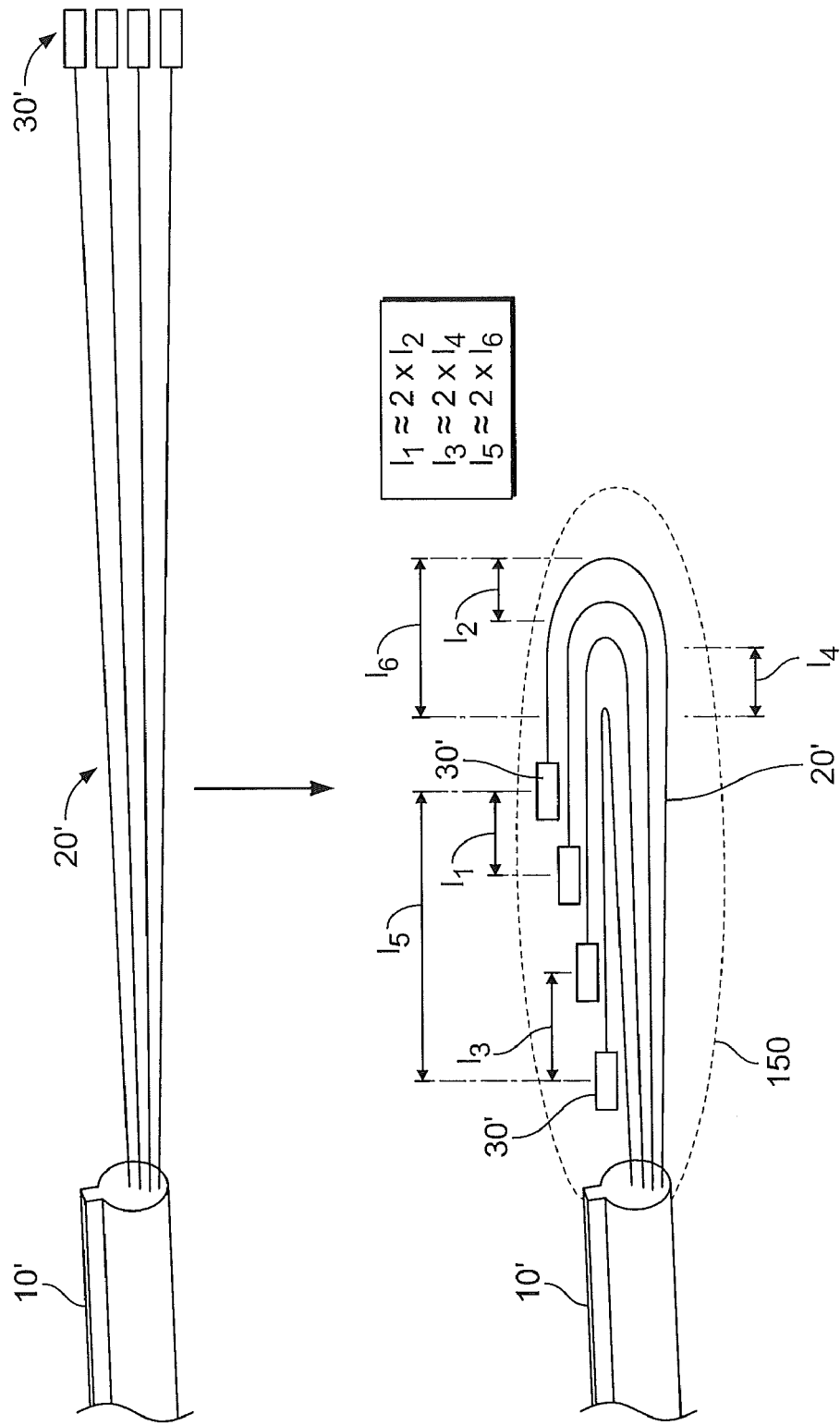
FIG. 23 is a perspective view of a low-profile pulling device according to some embodiments of the present invention.

In the case of a zip tube 10 terminated with multiple single fiber connectors 30', a low-profile pulling device 150 configured to hold multiple equal length terminated fibers 20' may be provided in some embodiments as illustrated in FIG. 23. Without the device 150, passing the zip tube/jacket 10' end through the reduced diameter conduit may be impractical due to the larger overall diameter of the connector 30' grouping if they are not linearly/longitudinally displaced when passed through the conduit. The illustrated device 150 is configured to receive the multiple fibers 20' arranged to fold back onto themselves and to position the connectors 30' in a staggered array linearly/longitudinally along the return fiber path.

In some embodiments, the device 150 is further configured to provide fold back bend control while protecting the connectors 30' and fibers 20'. The configuration of the device 150 may be substantially similar to the loop back protective apparatus 201 (FIG. 12), with multiple bend limiting features 72 at the various fold back locations arranged to correspond at a desired spacing, such as approximately one half of the staggered array connector spacing along the return fiber path. The low profile pulling device 150 may enable passing/pulling the zip tube end through the stairwell/floor wall and reduced diameter conduit to the floor box 71, however, a single or ribbon splice could be used in place of the connectors to join the horizontal to the vertical at the floor box 71.

Figure 20:
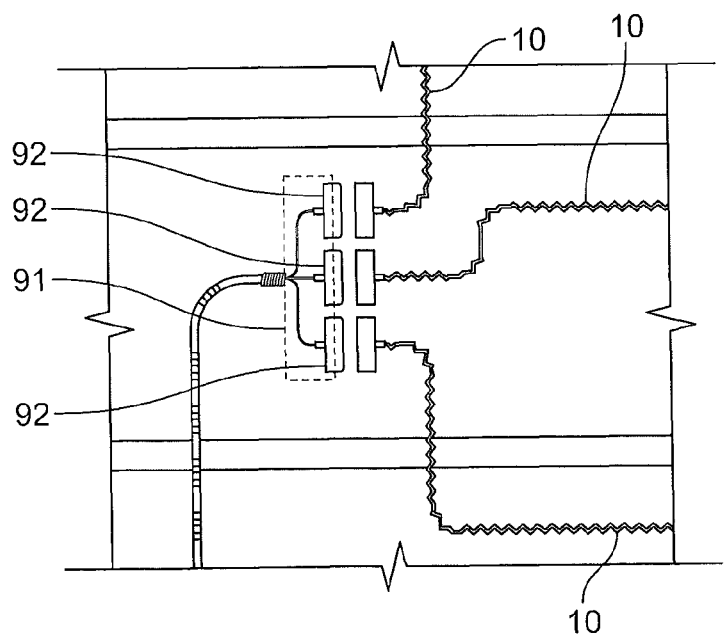
Figure 21:
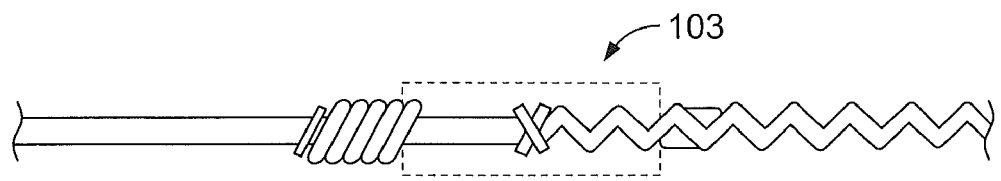

A collector box approach is illustrated as used for floors four, five and six, as detailed in FIG. 20. For this configuration example, a dashed three dot line represents a multi-fiber stub that exits a collector box (source connection location) 91 and runs to the fiber distribution hub (FDH) 89 located in the basement. The collector box 91 has three multi-fiber connectors 92 illustrated in FIG. 20. Each of these connectors 92 is terminated to an associated fiber or group of fibers in a zip tube optical fiber protection jacket 10 that serves its respective floor. A single or ribbon splice could be used in place of the connectors.

The seventh floor in the illustrated example configuration of FIG. 17 uses two cable assemblies with a junction (source connection location) 101, which is schematically shown in FIG. 17 and may correspond to the arrangement shown in more detail in FIG. 14. The eighth floor also is shown as using two cable assemblies, however, in this case they are joined via a field splice at a source connection location 103 as illustrated in more detail in FIGS. 13 and 21. The enclosure is represented by the dashed line with an "x" denoting the splice in FIG. 21. Strain relief and strength member termination is represented by the slash marks in FIG. 21.

The ninth floor in the illustrated example configuration of FIG. 17 is illustrated as using an inline method in which the horizontal or the vertical section is placed first, for example, by uncoiling it off a reel. The remaining section could then be deployed, for example, using a figure eight or cloverleaf technique, as described, for example, in U.S. Pat. No. 7,330,627, to reduce or even eliminate twisting associated with spool deployment. The sections are shown as mating at a junction (source connection location) 105.

The tenth floor in the illustrated example configuration of FIG. 17 is also shown as using an inline method that a takes the zip tube optical fiber protection jacket 10 all the way from the fiber distribution hub 89 to the end of run loop back apparatus 201. As such, for the tenth floor, the fiber distribution hub 89 is the source connection location. In this case the fiber can be, for example, pulled up and over to the end of run at the loop back apparatus 201 or over and down to the FDH 89 depending on the construction requirements. To accomplish this method the fiber's axial movement may need to be restricted. This can be accomplished, for example, with factory installed gel or adhesive blocks placed inside the zip tube jacket 10, schematically represented as dots along the vertical path of the zigzag line in FIGS. 17 and 19.

Figure 22:
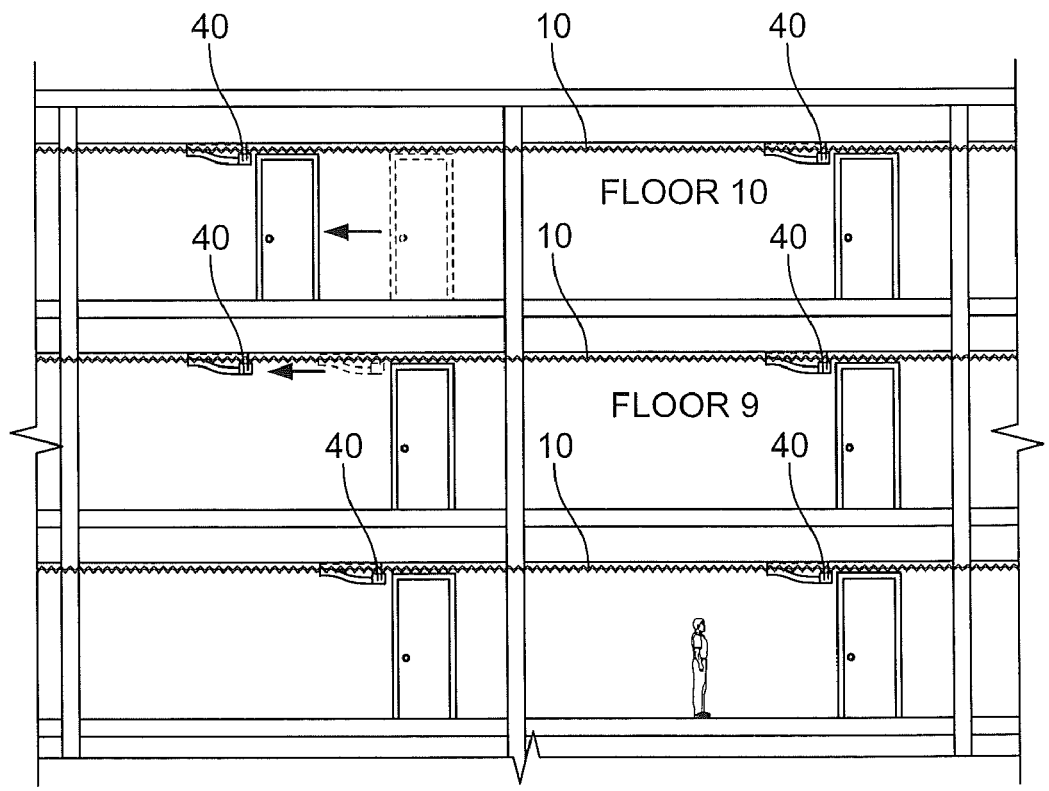

FIG. 22 illustrates a beneficial application of a field installed adapter terminal 40 that can be placed in any location along the fibers path. In this case the doorway for unit two on floor ten was shifted in a renovation job and does not match the construction prints. Likewise, the entry point for unit two on floor nine had to be shifted to accommodate the subscriber's needs. In either case, a factory installed terminal apparatus based on a rudimentary survey or building plans would prove to be incorrect when construction placed the cable harness. In contrast, as seen in FIG. 22, the terminal apparatus 40 on each of floors 9 and 10 is readily placed in the actual desired location.

Figure 24:
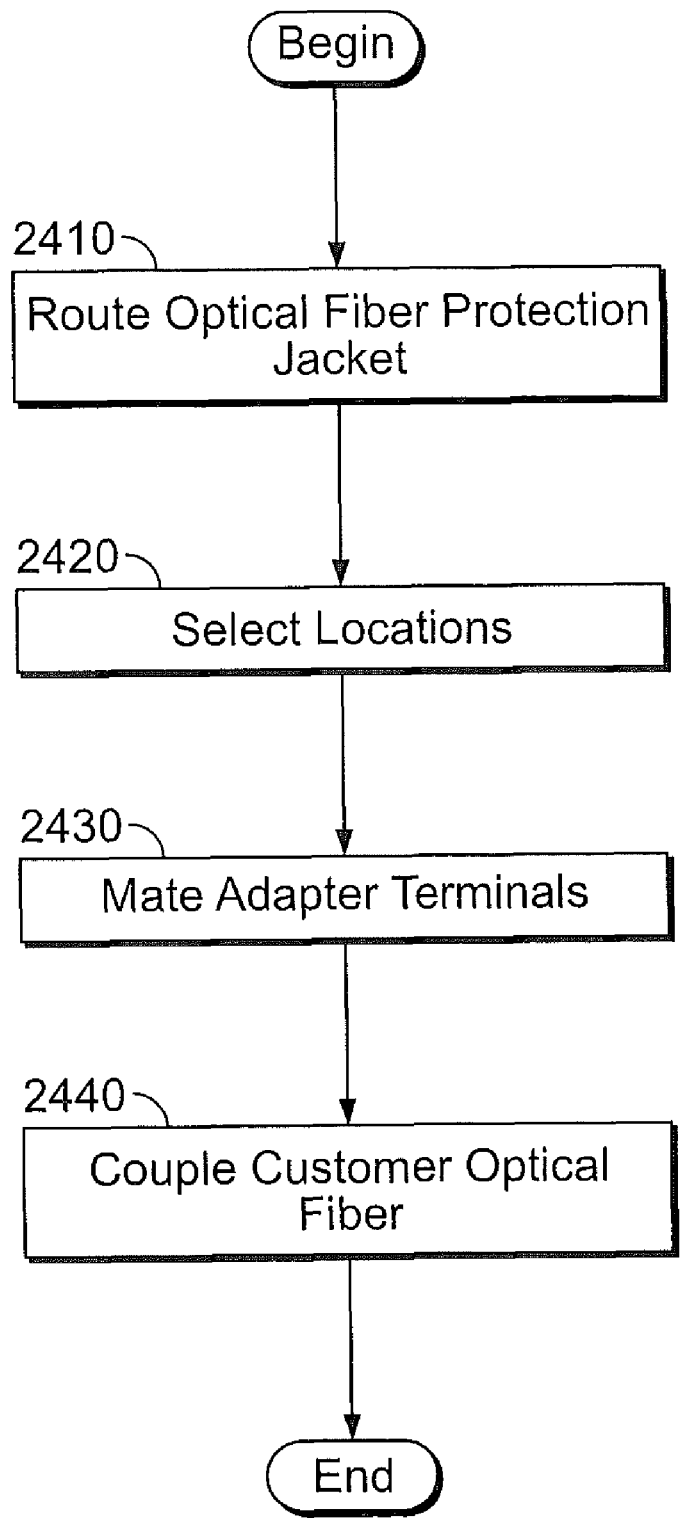
FIG. 24 is a flowchart illustrating operations for installing a fiber optic system in a multi-unit dwelling (MDU) according to some embodiments of the present invention.
Figure 25:
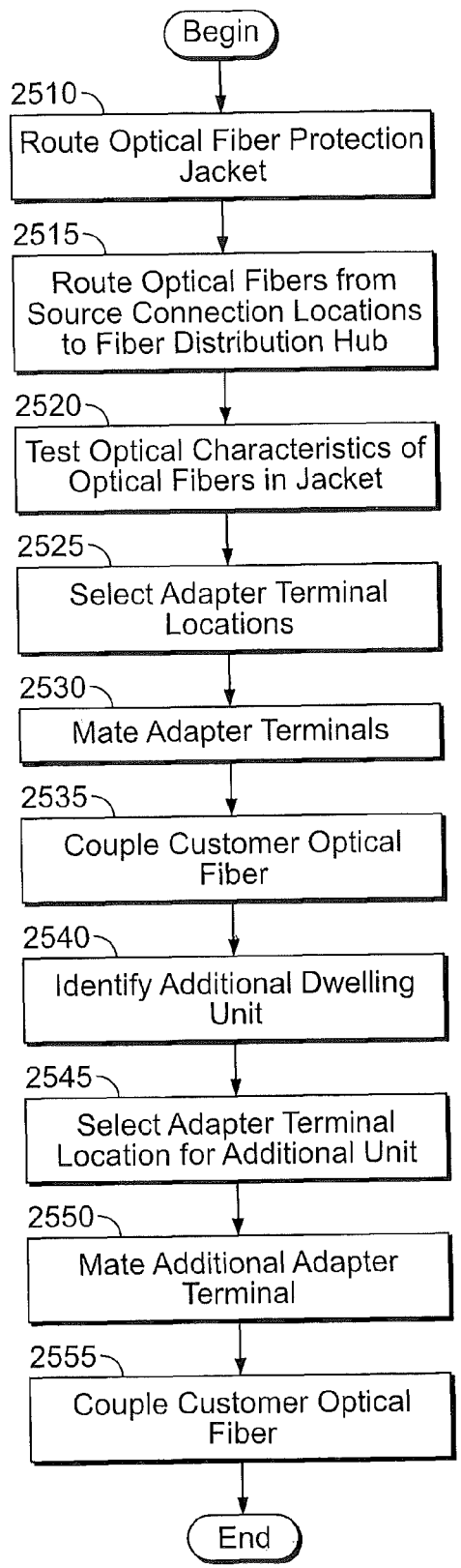
FIG. 25 is a flowchart illustrating operations for installing a fiber optic system in a multi-unit dwelling (MDU) according to further embodiments of the present invention.

Embodiments of methods of installing a fiber optic system in a multi-dwelling unit (MDU) will now be further described with reference to the flow chart illustrations of FIGS. 24 and 25. For the embodiments of FIG. 24, operations begin at Block 2410 with routing a longitudinally extending optical fiber protection jacket that is wrapped around a plurality of optical fibers from a source connection location along a selected path through the multi-dwelling unit. The selected path extends past a plurality of dwelling units within the multi-dwelling unit. A plurality of longitudinal locations along the optical fiber protection jacket are selected that are associated with respective ones of the dwelling units (Block 2420). The optical fiber protection jacket includes a pre-defined longitudinally extending seam that can be opened at the selected longitudinal locations along the jacket to define a plurality of openings at the selected longitudinal locations on the optical fiber jacket to provide access to the optical fibers through the openings in the optical fiber protection jacket at the selected longitudinal locations on the optical fiber protection jacket. The seam may be repeatably and selectively closable. A plurality of adapter terminals are mated to the optical fiber protection jacket at the selected longitudinal locations (Block 2430). The adapter terminals are configured to mate with an outer profile of the optical fiber protection jacket at the selected longitudinal locations and each of the adapter terminals includes a body portion that is configured to couple one of the optical fibers extending from an underlying one of the openings to a customer optical fiber. The customer optical fiber is coupled to the source optical fiber from optical fiber protection jacket (Block 2440). It will be understood that the operations of routing the optical fiber protection jacket, selecting the locations and mating the adapter terminals at Blocks 2410-2430 may be carried out for a plurality of optical fiber protection jackets along different paths to provide access to ones of the optical fibers at locations associated with different ones of the dwellings For the embodiments of FIG. 25, operations begin at Block 2510 with routing a longitudinally extending optical fiber protection jacket that is wrapped around a plurality of optical fibers from a source connection location along a selected path through the multi-dwelling unit. The selected path extends past a plurality of dwelling units within the multi-dwelling unit. In some embodiments where the multi-dwelling unit is a multi-floor building and respective ones of the paths extend along different ones of the floors, routing operations as shown by Block 2515, include routing the optical fibers from a plurality of source connection locations on the different ones of the floors to a fiber distribution hub and the optical fiber protection jackets are secured at the source connection locations to optical fiber cables extending to the fiber distribution hub.

The optical characteristics of the routed optical fibers are tested from the source connection location (Block 2520). To support the testing at Block 2520, a loop back apparatus at a first longitudinal end of the optical fiber protection jacket displaced from a second longitudinal end at the source connection location contains a bend limiting member around which the plurality of optical fibers are wrapped to provide a continuous light path from a first end of the optical fibers at the first longitudinal end of the optical fiber protection jacket to a second end of the optical fibers at the second end of the optical fiber protection jacket. In some embodiments, the testing of the optical characteristics is performed from the fiber distribution hub.

A plurality of longitudinal locations along the optical fiber protection jacket are selected that are associated with respective ones of the dwelling units (Block 2525). The optical fiber protection jacket includes a pre-defined longitudinally extending seam that can be opened at the selected longitudinal locations along the jacket to define a plurality of openings at the selected longitudinal locations on the optical fiber jacket to provide access to the optical fibers through the openings in the optical fiber protection jacket at the selected longitudinal locations on the optical fiber protection jacket. The seam may be repeatably and selectively closable. A plurality of adapter terminals are mated to the optical fiber protection jacket at the selected longitudinal locations (Block 2530). The adapter terminals are configured to mate with an outer profile of the optical fiber protection jacket at the selected longitudinal locations and each of the adapter terminals includes a body portion that is configured to couple one of the optical fibers extending from an underlying one of the openings to a customer optical fiber. The customer optical fiber is coupled to the source optical fiber from optical fiber protection jacket (Block 2535).

In some embodiments, an additional dwelling unit in the multi-dwelling unit is identified that is to be provided a connection to one of the optical fibers (Block 2540). A location along one of the optical fiber protection jackets associated with the additional dwelling unit is selected (Block 2545). An additional adapter terminal is mated to the associated optical fiber protection jacket at the selected location (Block 2550). The a customer optical fiber associated with the additional dwelling unit is coupled to the one of the optical fibers using the additional adapter terminal (Block 2555).

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. In the claims, means-plus-function clauses are intended to cover the structures described herein as performing the recited function and not only structural equivalents but also equivalent structures. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

That which is claimed:

1. A fiber optic system for a multi-dwelling unit, comprising:
    a plurality of optical fibers;
    a longitudinally extending optical fiber protection jacket wrapped around the optical fibers, wherein the optical fiber protection jacket includes a pre-defined longitudinally extending seam that can be opened at selected longitudinal locations along the jacket to define a plurality of openings at the selected longitudinal locations on the optical fiber jacket to provide access to the optical fibers through the openings in the optical fiber protection jacket at the selected longitudinal locations on the optical fiber protection jacket; and
    a plurality of adapter terminals configured to mate with an outer profile of the optical fiber protection jacket at the selected longitudinal locations, wherein each of the adapter terminals includes a body portion that is configured to support a coupling between one of the optical fibers extending from an underlying one of the openings to a customer optical fiber.

2. The fiber optic system of claim 1, wherein the seam is repeatably and selectively closable.

3. The fiber optic system of claim 2, wherein the optical fiber protection jacket comprises a wrap-around jacket with a first zip engagement member on a first transverse end thereof and a mating second zip engagement member on an opposite second transverse end thereof defining the seam and wherein the adapter terminals include a zip engagement member receiving channel that is configured to receive the first and second engagement members when the adapter terminals are coupled to the optical fiber protection jacket and the channel is configured to facilitate closing of an underlying one of the openings in the optical fiber protection jacket.

4. The fiber optic system of claim 1, further comprising a loop back apparatus at a first longitudinal end of the optical fiber protection jacket, the loop back apparatus comprising:
   a bend limiting member around which the plurality of optical fibers are wrapped to provide a continuous light path from a first end of the optical fibers at a second, opposite longitudinal end of the optical fiber protection jacket to a second end of the optical fibers at the second end of the optical fiber protection jacket; and
   an outer cover enclosing the bend limiting member and segments of the optical fibers extending from the first end of the optical fiber protection jacket.

5. The fiber optic system of claim 4, wherein the outer cover includes an opening allowing access to the bend limiting device and the optical fibers therein and wherein the loop back apparatus further comprises a pulling eye coupled to the opening that is movable to a closed position in which access to the bend limiting device through the opening in the outer cover is limited.

6. The fiber optic system of claim 5, wherein at least one of the optical fibers includes a splice between the first and second longitudinal ends thereof that is positioned in the segment of the at least one of the optical fibers extending from the first end of the optical fiber protection jacket and wherein the loop back apparatus further comprises a wrap around enclosure positioned within the outer cover that holds the splice.

7. The fiber optic system of claim 1, wherein the adapter terminal is configured to be snapped onto and longitudinally slidable along the optical fiber protection jacket and wherein the adapter terminal includes a first flexible arm portion and a second flexible arm portion extending from the body portion that are configured to extend around respective sides of the optical fiber protection jacket and snap the adapter terminal onto the optical fiber protection jacket and wherein the flexible arm portions each include a latch member at an end thereof displaced from the body portion and the optical fiber protection jacket includes mating latch members on the outer surface thereof that are configured to engage the latch member of the flexible arm portions when the adapter member is snapped on the outer protective jacket.

8. The fiber optic system of claim 7, further comprising:
   a plurality of clips configured to secure the optical fiber protection jacket in a selected location; and
   wherein each of the adapter terminals further comprises a protective cover that is configured to limit longitudinal movement of the adapter terminals when the protective covers are placed over the body portion of the adapter terminals on the optical fiber protection jacket, wherein the body portion of the adapter terminals includes a first optical fiber port configured to receive a source connector coupled to the optical fiber extending from the optical fiber protection jacket and a second optical fiber port configured to receive a customer connector coupled to the customer optical fiber, wherein the adapter terminals further comprise a dust cap having a closed position covering the second optical fiber port and an open position not covering the second optical fiber port to allow the customer connectors to be inserted into the second optical fiber ports and wherein the dust cover is spring loaded towards the closed position and configured to be held in the open position by the customer connectors when the customer connectors are inserted in the second optical fiber ports.

9. The fiber optic system of claim 1, further comprising a plurality of longitudinal movement restricting members positioned at selected longitudinal locations in the optical fiber protection jacket that limit longitudinal movement of the optical fibers within the optical fiber protection jacket.

10. The fiber optic system of claim 9, wherein the longitudinal movement restriction members comprise gel and/or adhesive blocks.

11. The fiber optic system of claim 1, further comprising a connector coupled to a first end of at least one of the plurality of optical fibers positioned at a first longitudinal end of the optical fiber protection jacket.

12. The fiber optic system of claim 11, further comprising a strain relief member coupling the connector to the first longitudinal end of the optical fiber protection jacket.

13. The fiber optic system of claim 11, wherein the connector comprises a multi-fiber connector (MFC) coupled to the first ends of a plurality of the optical fibers.

14. The fiber optic system of claim 11, further comprising a loop back apparatus at a second, opposite longitudinal end of the optical fiber protection jacket, the loop back apparatus comprising:
   a bend limiting member around which the plurality of optical fibers are wrapped to provide a continuous light path from the first end of the optical fibers to a second end of the optical fibers at the first end of the optical fiber protection jacket; and
   an outer cover enclosing the bend limiting member and segments of the optical fibers extending from the second end of the optical fiber protection jacket.

15. The fiber optic system of claim 1, wherein ends of the plurality of optical fibers extending from a first end of the optical fiber protection jacket have a substantially same length thereof extending from the optical fiber protection jacket and have connectors on the ends thereof and wherein the fiber optic system further comprises a low-profile pulling device that is configured to hold the optical fibers extending from the optical fiber protection jacket in an arrangement with the fibers folded back onto themselves to define a return fiber path and to hold the connectors positioned in a staggered array along the return fiber path to provide the low profile pulling device a reduced width from a longitudinal offset of ones of the connectors allowing the connectors to be positioned closer to a center of the low profile pulling device without contacting each other.

16. A low-profile pulling device for pulling a plurality of optical fibers having connectors thereon through a conduit, the pulling device comprising a body member configured to hold the optical fibers in an arrangement with the fibers folded back onto themselves to define a return fiber path and to hold the connectors positioned in a staggered array along the return fiber path to provide the low profile pulling device a reduced width from a longitudinal offset of ones of the connectors allowing the connectors to be positioned closer to a center of the body member without contacting each other.

17. The pulling device of claim 16, wherein the body member further includes a plurality of bend limiting members positioned at respective fold back locations that are configured to limit bending of corresponding ones of the optical fibers when folded back around the respective bend limiting members.

18. A method of installing a fiber optic system in a multi-dwelling unit, comprising:

routing a longitudinally extending optical fiber protection jacket that is wrapped around a plurality of optical fibers from a source connection location along a selected path through the multi-dwelling unit, the selected path extending past a plurality of dwelling units within the multi-dwelling unit;

selecting a plurality of longitudinal locations along the optical fiber protection jacket that are associated with respective ones of the dwelling units, wherein the optical fiber protection jacket includes a pre-defined longitudinally extending seam that can be opened at the selected longitudinal locations along the jacket to define a plurality of openings at the selected longitudinal locations on the optical fiber jacket to provide access to the optical fibers through the openings in the optical fiber protection jacket at the selected longitudinal locations on the optical fiber protection jacket; and mating a plurality of adapter terminals to the optical fiber protection jacket at the selected longitudinal locations, wherein the adapter terminals are configured to mate with an outer profile of the optical fiber protection jacket at the selected longitudinal locations and wherein each of the adapter terminals includes a body portion that is configured to couple one of the optical fibers extending from an underlying one of the openings to a customer optical fiber.

19. The method of claim 18, wherein the seam is repeatably and selectively closable.

20. The method of claim 19, wherein routing the optical fiber protection jacket, selecting the locations and mating the adapter terminals are carried out for a plurality of optical fiber protection jackets along different paths to provide access to ones of the optical fibers at locations associated with different ones of the dwellings.

21. The method of claim 20, wherein routing the optical fiber protection jacket is followed by testing the optical characteristics of the routed optical fibers from the source connection location and wherein a loop back apparatus at a first longitudinal end of the optical fiber protection jacket displaced from a second longitudinal end at the source connection location contains a bend limiting member around which the plurality of optical fibers are wrapped to provide a continuous light path from a first end of the optical fibers at the first longitudinal end of the optical fiber protection jacket to a second end of the optical fibers at the second end of the optical fiber protection jacket.

22. The method of claim 21, wherein the multi-dwelling unit comprises a multi-floor building and wherein respective ones of the paths extend along different ones of the floors and wherein the method further comprises routing the optical fibers from a plurality of source connection locations on the different ones of the floors to a fiber distribution hub and wherein the optical fiber protection jackets are secured at the source connection locations to optical fiber cables extending to the fiber distribution hub and wherein testing the optical characteristics comprises testing the optical characteristics from the fiber distribution hub.

23. The method of claim 19, wherein mating the adapter terminals is followed by:

identifying an additional dwelling unit in the multi-dwelling unit to be provided a connection to one of the optical fibers;

selecting a location along one of the optical fiber protection jackets associated with the additional dwelling unit; and mating an additional adapter terminal to the associated optical fiber protection jacket at the selected location; and coupling the customer optical fiber associated with the additional dwelling unit to the one of the optical fibers using the additional adapter terminal.

* * * * *